United States Patent [19]
Aldred et al.

[11] Patent Number: 5,649,105
[45] Date of Patent: Jul. 15, 1997

[54] COLLABORATIVE WORKING IN A NETWORK

[75] Inventors: Barry Keith Aldred; Gordon William Bonsall, both of Winchester; Howard S. Lambert, Southampton; Harry David Mitchell, Richmond-upon-Thames, all of United Kingdom

[73] Assignee: IBM Corp., Armonk, N.Y.

[21] Appl. No.: 256,211

[22] PCT Filed: Nov. 10, 1993

[86] PCT No.: PCT/GB93/02315

§ 371 Date: Jun. 27, 1994

§ 102(e) Date: Jun. 27, 1994

[87] PCT Pub. No.: WO94/11814

PCT Pub. Date: May 26, 1994

[30] Foreign Application Priority Data

Nov. 10, 1992 [GB] United Kingdom ............ 9223521

[51] Int. Cl.$^6$ .................................................. G06F 15/16
[52] U.S. Cl. ..................... 395/200.04; 395/800; 395/326
[58] Field of Search ........................ 395/200, DIG. 1, 395/800, 200.04, 200.03, 200.13; 370/62

[56] References Cited

U.S. PATENT DOCUMENTS

| | | | |
|---|---|---|---|
| 5,195,086 | 3/1993 | Baumgartner et al. | 370/62 |
| 5,208,912 | 5/1993 | Nakayama et al. | 395/200 |
| 5,247,615 | 9/1993 | Mori et al. | 395/200 |
| 5,357,068 | 10/1994 | Rozier | 200/148 R |
| 5,363,507 | 11/1994 | Nakayama et al. | 395/800 |
| 5,379,374 | 1/1995 | Ishizaki et al. | 395/155 |

OTHER PUBLICATIONS

"Novell now shipping Netware Global Messaging", The LocalNetter, Sep. 1992 v12 n9 p. 25(1).

"E-mail: Novell shipping Netware Global Messaging Server", EDGE on & About AT&T, Aug. 10, 1992 v7 n211 p. 23(1).

"Promises & Pitfalls: how collaborative systems work", Janca, Peter C, Corporate Computing Nov. 1992 v1 n5 p. 185 (4).

"It's in the Mail: E-mail has grown into a serious network tool for info exchange", Krivda, Cheryl D, LAN Computing Aug. 1992 v3 n8 p. 19(5).

U. K. Search Report "A Multipoint Communication Service for Interactive Applications" by G. Vonderweidt et al, IEEE Transactions on Communications, vol. 39, No. 12, Dec. 1991.

*Primary Examiner*—Alyssa H. Bowler
*Assistant Examiner*—Walter D. Davis
*Attorney, Agent, or Firm*—Jeanine S. Ray-Yarletts

[57] ABSTRACT

A programmable workstation for collaborative working in a network comprises a conventional operating system and a network control program layer. Additionally, the workstation includes a collaborative application support subsystem for interfacing with application programs. The subsystem is responsive to predetermined application program calls to create a logical network model of a collaborative environment. The model comprises sharing sets of application programs, which share data and resources across nodes and logical dedicated data channels connecting members of the sharing set. The subsystem cooperates with the network layer to establish the physical links necessary to implement the model in a physical network, transparently to the application program.

20 Claims, 17 Drawing Sheets

COLLABORATIVE WORKING IN A NETWORK

RELATED APPLICATION

This application is related to co-pending, commonly assigned application Ser. No. 08/256,209, filed Jun. 27, 1994, entitled "Call Management in a Collaborative Working Network".

DESCRIPTION

This invention relates to collaborative working in a network and more specifically to a programmable workstation and a method for use in such a collaborative working environment.

BACKGROUND OF THE INVENTION

Personal computers are now widespread throughout the business community and many are able to intercommunicate, either through fixed connections e.g. local area networks, or through dynamically established links e.g. ISDN or async lines over the public switched telephone network. Increasingly, these connected personal computers can be used to enhance collaborative working between remote individuals; a typical example being the use of desk top conferencing software. Successful collaborative work generally requires more than a simple data link between the participants; voice capabilities are normally essential and video links are frequently required. Thus remote collaborative working can often be regarded as an extension to the traditional telephone call—it being enhanced with the data and programs available at the desktop via the personal computer—and, on occasions, enriched with video services.

A broad spectrum of collaborative applications can be envisaged, ranging from utilities taking advantage of the data and applications on a workstation, e.g. sharing of screen windows and files, through to new collaborative applications designed to meet the needs of specific classes of remote user e.g. just-in-time education, remote presentations, executive broadcasts or help desk. The common requirements behind these examples are:

the support of a wide variety of personal computer platforms—both hardware and software.

operation over the existing communication networks.

group communications and multi-media data services.

Although desk top conferencing systems employing multi-media devices and communications channels exist, generally they are provided with a fixed set of system software and utility applications which is insufficiently flexible to meet the needs of all potential applications.

Accordingly the present invention provides a programmable workstation for collaborative working in a network of workstations forming the nodes of the network, the network being connected by physical links for the transmission of data between nodes;

the workstation comprising an operating system;

a network control program layer, running on the operating system, for controlling physical routing of multi-media data between nodes; and a collaborative application support program layer for interfacing with application programs running on the workstation and responsive to predetermined application program calls to create a logical network model of a collaborative environment comprising sharing sets of application programs, which share data and resources within and across nodes, and logical dedicated data channels connecting members of a sharing set of application programs, each data channel being defined by a sending port and a receiving port each associated with an application program, the collaborative application support program layer being adapted to cooperate with the network control program layer to establish the physical links necessary to implement the logical network model in a physical network, transparently to the application programs.

According to another aspect, the invention also provides A method in which, in response to a predetermined program call by a first application program through which data is being transferred, via receiving and sending ports of the first application, between two other applications, the receiving port of the first application is reversibly directly connected to its sending port so that the data transfer bypasses the first application programs.

BRIEF DESCRIPTION OF THE DRAWINGS

The invention will now be described by way of example only with reference to FIG. 1–25 of the accompanying drawings, in which.

DETAILED DESCRIPTION OF THE INVENTION

Figure 1:
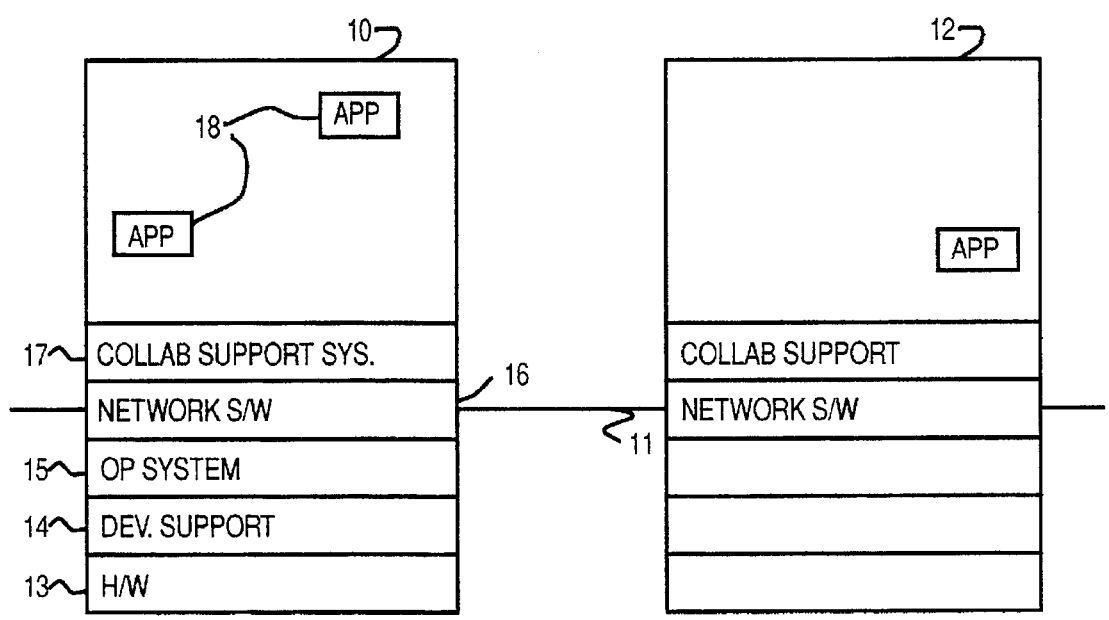
FIG. 1 shows two programmable workstations connected by a network.

In FIG. 1 are shown two programmable workstations 10 and 12 connected by link 11 in a network, such as a LAN or WAN. The principal components of the workstations are conventionally described as layers, starting with the hardware 13. The hardware which is not illustrated in detail, consists of a processor unit with main memory, secondary storage such as a disk file, a display unit and input/output devices such as keyboard and mouse. Device support software 14 enables the hardware devices to function within a known operating system 15, such as IBM's Operating System/2 (OS/2).

Also part of a conventional workstation, when used in a network, is networking software 16 for supporting connection to the network 11 and communication over the network between workstations. Typical networking software 16 could be the Netbios program product from IBM. Up to this point all that has been described is a conventional networking workstation capable of executing application programs 18.

In order to implement the present invention, each workstation also includes collaborative application support system software 17 which facilitates the development of application programs for creating a distributed collaborative working environment. In this environment, end-users of the workstation may communicate with users of other workstations in the network over multi-media channels and may work collaboratively on shared data and tasks.

Figure 2:
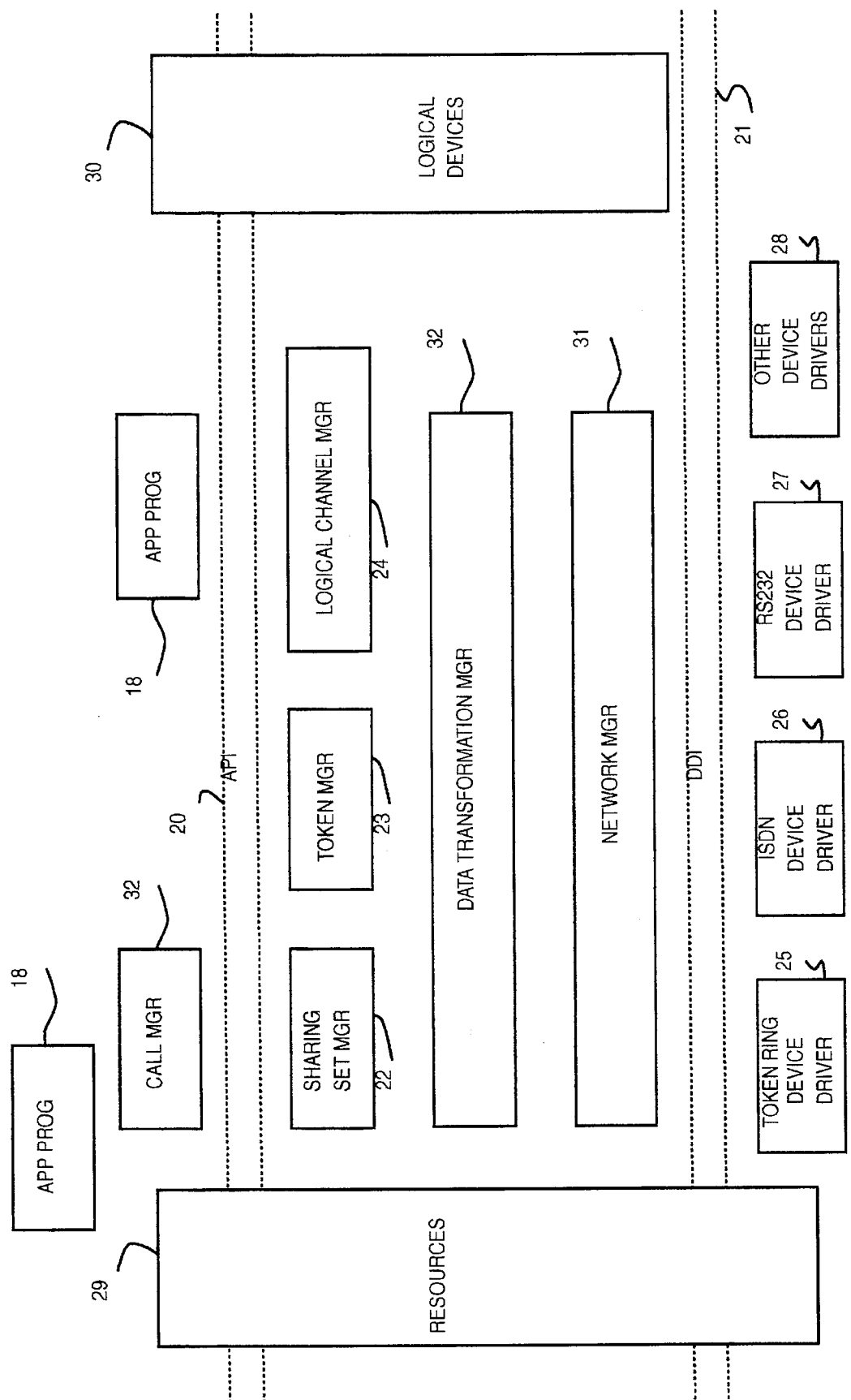
FIG. 2 illustrates the relationship between the support program shown in FIG. 1 and other software components on a workstation.
Figure 10:
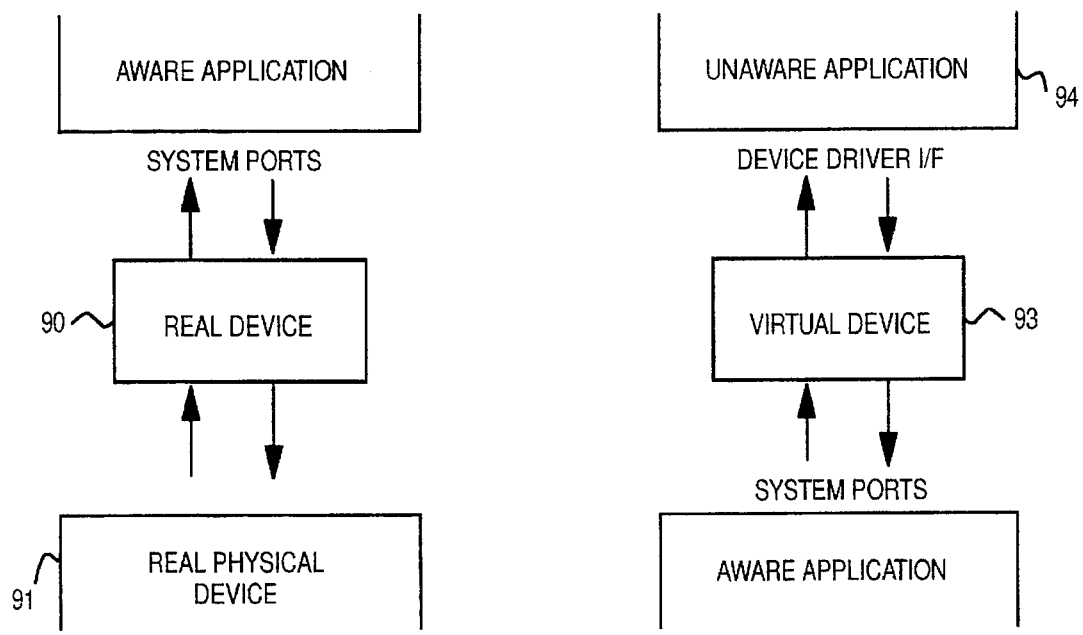
FIG. 10 illustrates the components of the support program.

The overall structure of support system 17 in relation to other software components of the workstation with which it interfaces directly is shown in FIG. 2. Further details of the internal structure of the support system are shown in FIG. 10. Broadly speaking, the main functional components of system 17 lie between two interfaces 20 and 21, illustrated by dashed lines.

An application programming interface 20 allows applications 18 to request support services. A device driver interface 21 allows the system to support an extensible range of software and hardware communications subsystems through device drivers such as token ring driver 25, ISDN driver 26, RS232 driver 27 and other device drivers 28. Link support modules 228, 229 interface with the device drivers. These are replaceable, (FIG. 10 shows only a possible selection) depending on the hardware options available at the workstation, and serve to isolate the support system from needing to know precisely which hardware is present. Through an implicit resources interface, (not illustrated) details of the communications network, such as node addresses and directory data may be requested by both the support system, the applications and the device drivers from resource files 29.

The API 20 allows applications 18 to initiate peer applications and share resources, on a variety of hardware and software platforms, located on nodes across a diverse and complex communications networks. It allows them to define multiple dedicated logical data channels between shared applications, suitable to a broad range of multi-media traffic, independently of the structure of the underlying physical network. It allows them to serialise, synchronise, merge or copy the data streaming between shared applications. It also allows them to support a range of attached devices and to allow the interception and redirection of the device data.

The support system includes other components to assist application development such as an extensible set of logical devices 30, interfacing to external applications and devices. Also provided is a set of end-user utilities, written to the API (not illustrated), which can also invoked from applications through a command interface.

Network, nodes and applications

At the highest level, the programming model presented by the API consists of a communicating set of nodes. A node is the addressable entity representing a user, and comprises an instance of the support system software, and a set of resources such as application programs, data etc. Usually a node is typically a dedicated programmable workstation 10, capable of communicating with its peers; in a multi-user system a node is associated with each user.

Nodes are either supported nodes or non-supported nodes; a supported node is one where the support system software 17 is being executed, A collection of inter-communicating supported nodes is called a supported network.

Nodes are identified by name; ideally all node names should be unique but duplicates can be tolerated as long as their associated nodes are never required to inter-communicate. The choice of node naming scheme is not directly relevant to the present invention, although a hierarchical system such as that defined by the Internet protocol has many benefits. It is fundamental to the architecture that a node can dynamically join or leave the network.

Nodes can contain logical devices 30. A logical device is a software extension to the support system that allows an application to manipulate or manage software or equipment, in a manner consistent with other entities in the architecture. There is an extensive range of possible logical devices including: presentation windows, printers, disk drives, modems, and application programs.

Multiple applications can be executed at a node, subject to the constraints imposed there by the operating and windowing system. Applications are either aware or unaware; an aware application uses the services of the API; an unaware application does not. Both aware and unaware applications will generally be executing simultaneously at a node.

When the support system is fully active at a node, one particular aware application must be running at that node. This application plays a unique role at that node and is known as call manager 32. Many call managers may be available for execution at a particular node but only one can execute at a time. The distinguishing feature of a call manager is that it responds to certain events generated by the support system; for example, it resolves any requests that are not directed specifically at an instance of an application, and optionally it may also handle resource management for the node. Call manager responsibility can be transferred from one call manager to another; also the role can be combined with user application function if that is appropriate.

The support software 17 may request that the resources of one node are made available for communication between two other nodes; this is termed passive operation and permission is controlled by the call manager at the passive node. As an example, consider two nodes A and B on a LAN, with a third node C connected to B by an asynchronous communications link. If applications at A and C wish to communicate, the traffic will need to be routed via B. The consent of the call manager at B is required for this use of its node.

Aware applications can share data and resources with other aware applications at the same or different nodes. A collection of applications sharing is called a sharing set. An aware application initiates a share request, naming an application sharing set, a target application and a destination node. This request is first passed by the support software to the call manager at the sending node, which will typically transfer it to the call manager at the destination node. Usually this second call manager will launch the requested application and the source application will be informed. The participation of the call managers in this process allows both local control of the sharing process and other actions to be initiated if necessary. The call managers play a vital role in resolving the names used by applications to identify other nodes and applications. The sharing mechanism can be cascaded; for example, if two applications are already sharing, one of them can initiate a share with a third application naming the same sharing set, with the result that all three applications are then sharing with each other.

Applications may also make local share requests on behalf of other applications thereby allowing membership control of the sharing set to be delegated. Facilities exist for either the issuer, or the target of the share request, to name the application sharing set. These names are not required to be unique: thus multiple sharing sets with the same name can exist.

Figure 3:
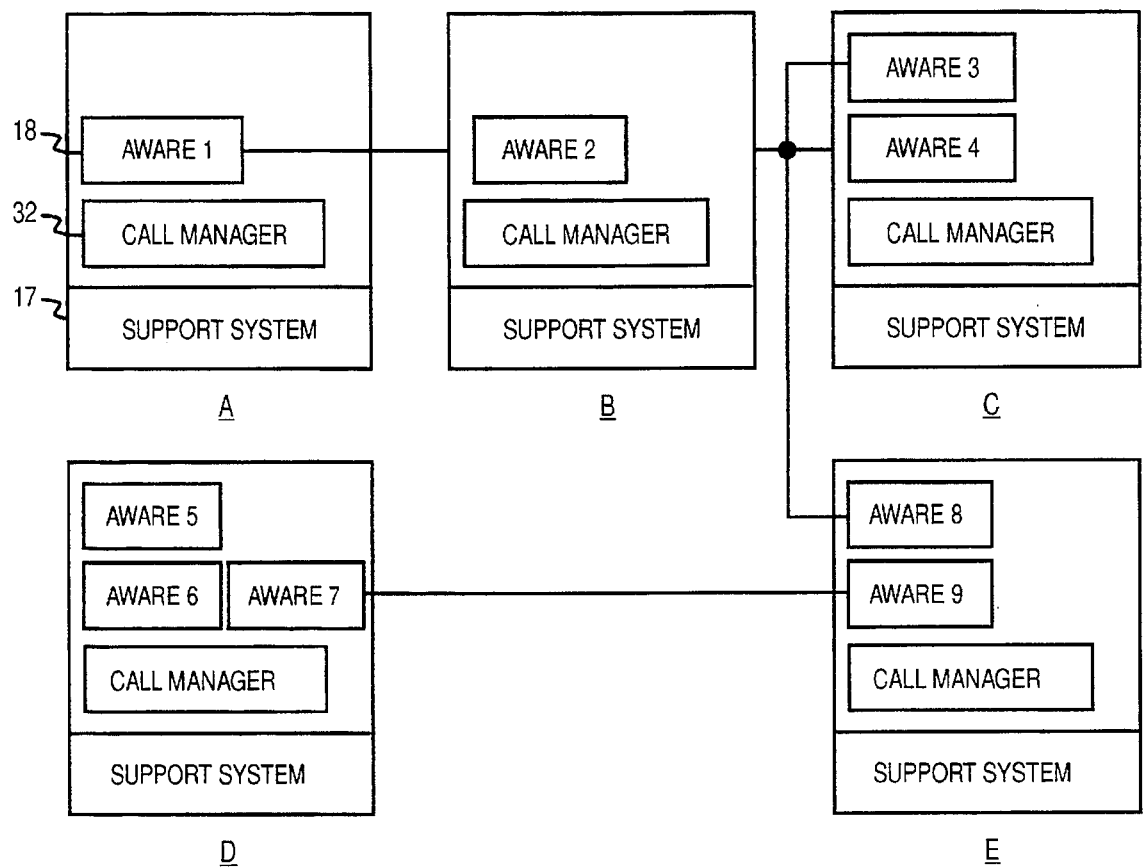
FIG. 3 illustrates applications being shared between the nodes.
Figure 4:
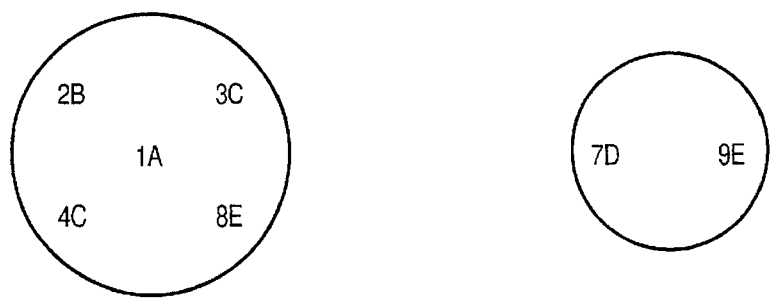
FIG. 4 shows the sharing sets resulting from the application sharing illustrated in FIG. 3.

Individual applications can cease sharing at any time, withdrawing from a sharing set; the other applications in the set are informed of the withdrawal. FIG. 3 shows a number of applications A-E sharing. This results in two sharing sets, irrespective of the order in which the shares were requested, as illustrated in FIG. 4.

Communications, channels and ports

Figure 5:
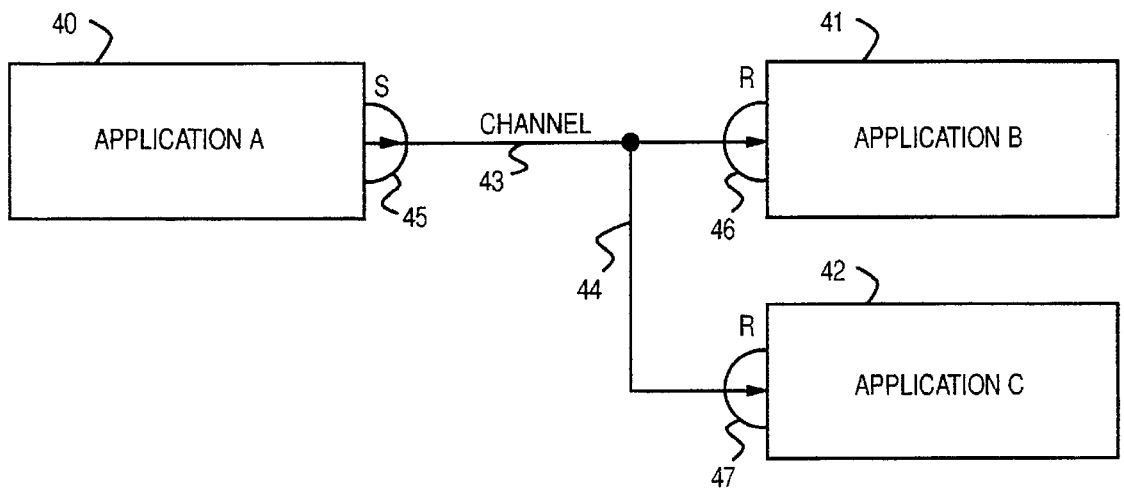
FIG. 5 shows applications linked by a data communication link or channel.

As illustrated in the schematic example of FIG. 5, applications in a sharing set such as 40, 41 and 42 can establish data communication links with each other known as channels. Channels such as 43 and 44 are logically dedicated and uni-directional pipes, with application specified transmission characteristics. A channel is always defined by the sending application and it goes from a sending application to a receiving application. The ends of channels are known as ports; thus all channels have one sending port and one receiving port. A sending port such as 45 sends data packets down the channel; a receiving port such as 46 receives data packets from the channel in the order in which they were sent. There may be no direct mapping between the logical channel structure seen by the aware applications and the physical communication network in existence between the nodes.

An application may establish multiple channels to another application as a convenient way to separate data traffic of different types. The system network manager 31, FIG. 2 may map some or all of the logical channels on to a single physical link such as link 11, FIG. 1 but this will be invisible to the application.

Channels have a number of quality of service characteristics, initially negotiated with the support system 17 during the creation process, which allow data transmission characteristics to be tailored to the requirements of the expected traffic. These characteristics include encryption, compression hints. Encryption allows the data to be encrypted during transmission along the channel; compression hints allow the system the option of compressing the data over narrow bandwidth links.

Quality of service parameters are defined according to signal type, which distinguishes analog from digital data. They need not be specified explicitly, but can be notified to the support system in terms of data classes. This mechanism allows video channels, voice channels and other data channels to be sensibly established. Channel characteristics can be re-negotiated after channel creation. The data transmission characteristics are implemented in the real network by means of the data transformation manager 32, FIG. 2 in response to the characteristics specified in the channel creation calls over the API.

Four types of channel are supported: standard, merged, synchronous and serialised. Standard channels are the default case; the other types are used in conjunction with collections of channels, known as channel sets. Through a merged channel set data packets are combined from multiple channels and delivered to each receiving application through a single port. There is no guarantee that each application receives all the data packets in the same sequence, only that each application receives all the packets. Through a serialising channel set data packets are combined from different channels, serialised, and delivered to each application such that each receiving port receives the same sequence of data. Through a synchronising channel set data is synchronised, so that the data packets on separate channels are tied together in time (for example voice with video), but delivered through the individual ports belonging to the channels.

Figure 6:
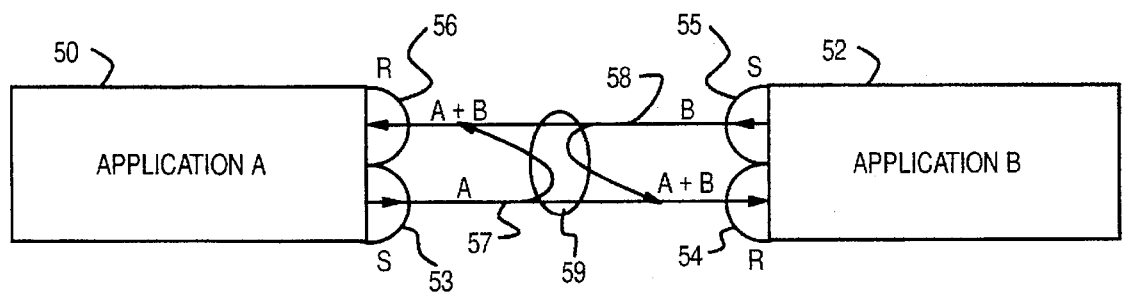
FIG. 6 shows applications linked by channels to provide serialization in a shared drawing board.

An example of data serialisation is illustrated by a shared drawing board application illustrated in FIG. 6. Two identical applications, A and B (50 and 52), allow their users to draw on a single shared surface. In order that the users at A and B see identical results, all the drawing orders at A must be sent to B via ports 53 and 54, and vice versa via ports 55 and 56, in such a way that the sequence processed at A and B is identical. This is accomplished by each transmitting their own data both to each other and to themselves, over two channels 57 and 58 which are members of a common serialising channel set 59.

Figure 7:
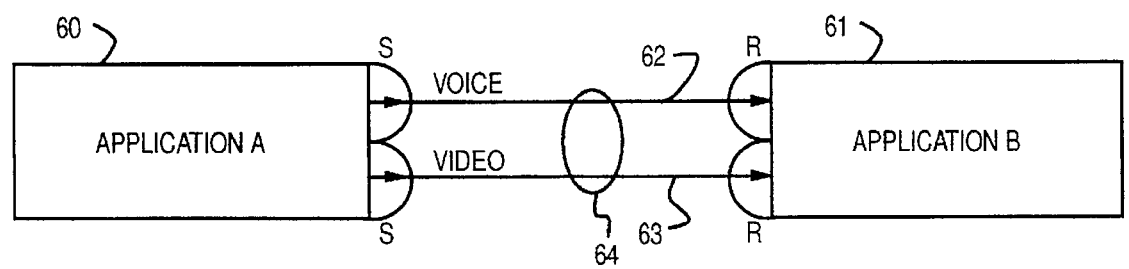
FIG. 7 shows the use of a synchronizing channel to provide data synchronization.

With reference to FIG. 7, data synchronisation is illustrated by an application A (60), that needs to send lip-synchronised video and voice to application B (61). Two channels 62 and 63 are used for the transmission, each being a member of the same synchronising channel set 64.

Channels can be explicitly created by an API call to the support system, specifying the required channel characteristics, and new channels can also be added to an existing port. The latter mechanism allows a port to be shared across channels belonging to different channel sets; for example data can be sent from a single port to one set of destinations belonging to a merged channel set, and to a second set of destinations belonging to a serialised channel set. Digital channels and analog channels cannot be members of the same channel set. A channel can be deleted, the channel being uniquely identified by specifying its sending and receiving ports.

Channels can be implicitly created as a consequence of an application being, or becoming, a member of an application sharing set. For example, if unshared applications already have a merged or serialized channel, and the channel set name used is identical across these applications, then when the applications share with each other, the additional channels required will be created automatically. Applications are notified of channels implicitly created in this way.

Ports have an assigned connect type: event, command or null. Event ports generate an event when data is either available or is required; command ports allow the application to drive the receipt or supply of data to the port. Null ports are reserved for ports that are unable to supply data to an application e.g. ports associated with analogue channels, such as the sending port of a video camera. Ports can be controlled through "signal_port" commands sent to their port event handler. These can be issued to the local port and can be passed to any other port in the channel. Normally, the signal commands for channel ports will be sent to the port event handler of the application either supplying or receiving data, and may be used for example to stop, start, decrease or increase the data flow. The order of signals between a source and target is maintained. Signals sent to receiving ports in a serialising channel set are serialised themselves, so that all sources receive the same sequence of commands. Other typical signals are "rewind" or "pause" to a tape drive, or "change paper size" to a printer device.

User exits can be optionally associated with ports. This allows monitoring or manipulation of the data, after it has been supplied to a sending port, or before being presented by a receiving port. In the case of synchronised channels, synchronisation is performed from after the data leaves the sending port user exit, and up to the data being presented to the receiving port user exit.

Figure 8:
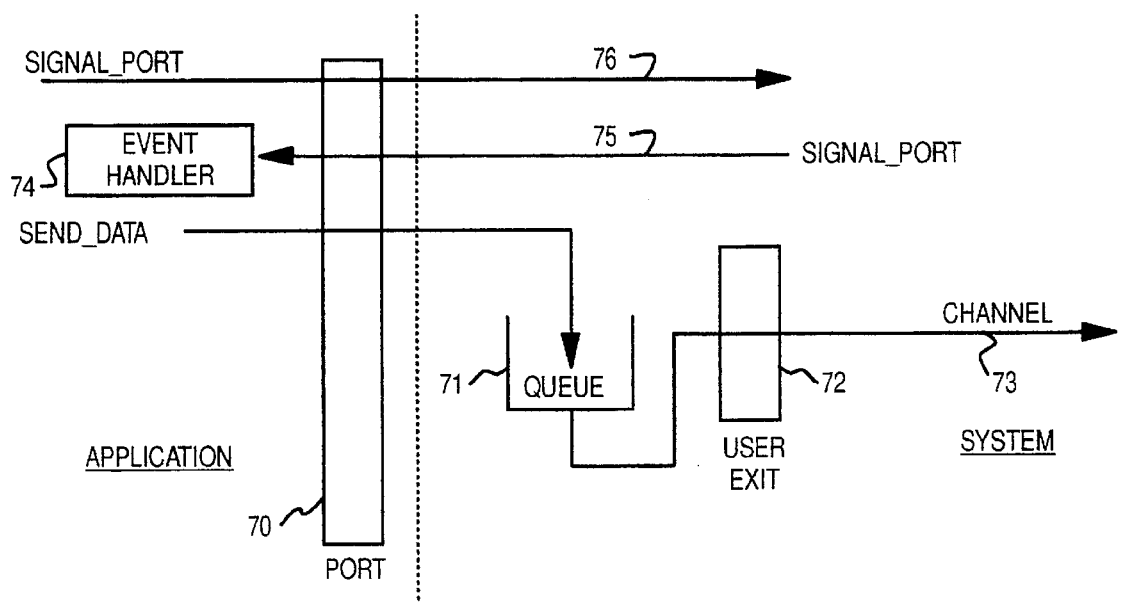
FIG. 8 shows the structure of a sending port at one end of a channel.

The overall structure of a standard sending command port is shown in FIG. 8. In response to a "send_data" command from an application, data is queued in a buffer 71 of port 70. The application empties the buffer to send data asynchronously over a channel 73 via a user exit 72. Incoming "signal_port" commands are received by the port event handler 74, independently of channel 73 on line 75 and can be retransmitted outwardly on line 76.

Receiving ports are effectively the mirror image of the corresponding *sending port. For a standard receiving event port the structure is similar, but in this case the event handler processes both the data and the port commands.

The situation is more complex when synchronisation is involved. In this case a standard receiving buffered port must be modified by the inclusion of the synchronisation process on the incoming channel prior to the user exit and the buffer.

Figure 9:
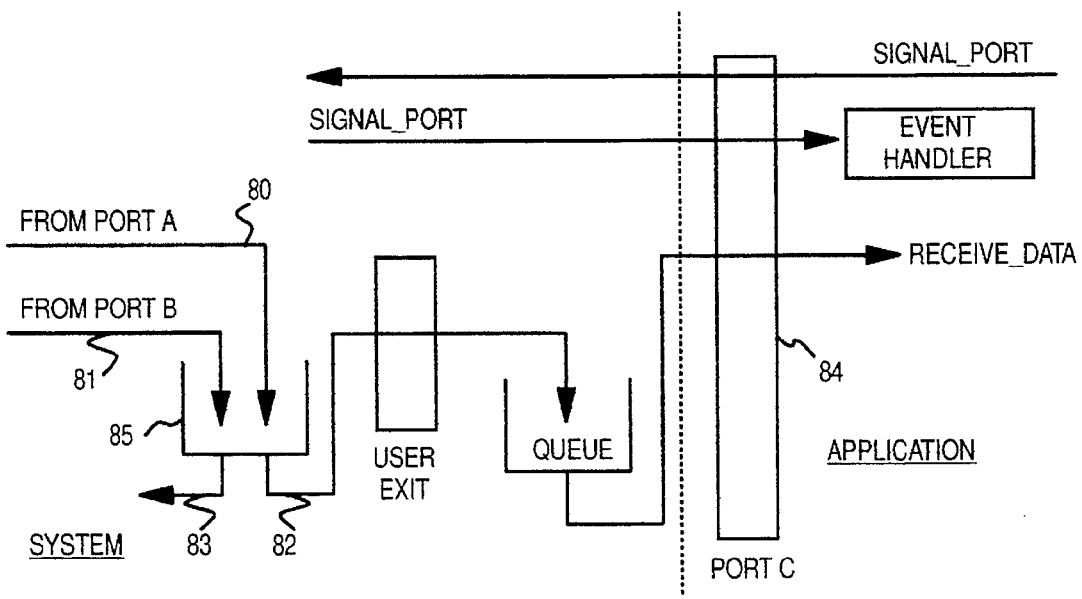
FIG. 9 shows the use of receiving ports to provide serialization.

Serialisation logically involves the collection of all events in a central point, followed by the broadcast of each event to all the destinations for that event. Diagrammatically, this is represented by FIG. 9 for the case of two ports A and B on channels 80 and 81, serialising their output at 82 and 83 to port C (84) and another port (not shown) in serialising process 85. Serialisation can be implemented at a single central point with all data being sent there for serialisation and subsequent distribution; alternatively the serialisation process itself can be distributed.

A receiving port can cause the sending port to stop sending data down the channel, with the option to either discard or deliver the remaining data in the channel. Suspended data transmission can be resumed subsequently.

An alternative method of application intercommunication, avoiding the use of channels and ports, is provided through a "signal" command which allows control information to be sent between applications.

Ports are associated with a data class which specifies data type and data sub-type. The data type identifies the nature of the data, e.g. voice, video, file etc. and also distinguishes analogue from digital data. The data types are further subdivided according to the precise format of the data; thus examples of voice sub-types are G.711, G.721, G.722.

The data class may be queried by an application to obtain the data format, independently of the data stream itself, without relying on other applications. Additionally, the data type may be different at the sending and receiving ports, with Lakes performing the conversions below the API.

Certain characteristics of ports and channels can be changed after they have been initially established; for example, quality of service, data class and compression hints. This provides the flexibility for an application to modify its communications usage during execution; an example being the temporary degradation of video quality to improve file exchange performance.

Ports can be connected together to establish extended communication links, so that an application may route its inputs through to another application for processing. When ports are connected in this way, and providing user exits have not been established, no further application involvement is required after the routing has been established. This allows the streaming of data between applications and devices. Connection is permitted between channels in different channel sets, of different types, having different quality of service characteristics, of different data class or different connect types (unless one of the ports is null), provided only that one port is sending and one port is receiving. Connected ports can also be welded, so that the connection is permanent and persists even when the local application has terminated. The channel behaves in all respects as though it had been originally created from its source directly to its destination. Any user exits which may be present are removed.

Logical Devices

Logical Devices 30 (FIG. 2) are supported by the support system to enable (i) easier access to system resource and devices, such as clipboard, DDE, printer and video devices, (ii) unaware applications to be used for collaborative working, for example by giving access to the window contents and file activity of an unaware application, and (iii) end to end data streaming without application involvement. Frequently used devices include: video capture, video playback, audio playback etc. and facilities are provided for additional devices to be defined.

Logical devices are identified by type; the type names are local to a node. When opened, they present a port to the application; a single logical device can have multiple ports, moreover a device can simultaneously present ports to different applications at the same node. The relevant API call to open a port allows characteristics to be established, peculiar to that device, for example the data formats to be used. Opened logical devices can be controlled through commands sent to the signal port, the commands being specific to the particular logical device. Typical commands to a device port are rewind or pause to a tape drive. The device status, for example whether data is available, can also be queried.

Devices are exactly like channel ports, except that no user exit is present. Applications can connect ports on logical devices to a channel port; this enable data to flow to or from the device and across the channel. This data flow does not require further application involvement once the connection has been made. For example, data can be streamed from a camera through a camera logical device, across a channel, and displayed by a window logical device. The application can control the two logical devices via there signal ports; when the transmission is no longer required, the application can disconnect the ports, close the devices and remove the channel.

Device ports cannot be welded to channel ports, since this would allow a device to exist outside the control of a local application. Logical devices are permitted to issue API calls to the support system, and in this regard act on behalf of the owning application (i.e. the application which opened the device). Devices for example can cause their owning application to share with other applications, create channels, and send or receive data. Potential devices include:

| | |
|---|---|
| system clipboard | LPTx |
| DDE | window |
| shared clipboard | printer |
| serial emulator | file |
| video | codec |
| audio | telephone |

Shared use of the clipboard is facilitated by the system clipboard and the shared clipboard devices. The system clipboard device may be opened by an application to provide a sending and a receiving port, giving access to the windowing system clipboard data at that node. Only one sending port may exist at any time, but any application at that node may open receiving ports. Through the use of channels, system clipboard data from one node, can be simply routed across to other members of an application sharing set.

Another device, the shared clipboard, is provided to ease data sharing. It is unique to a sharing set; only one sending port is allowed but multiple receiving ports are supported. Apart from these distinctions, it behaves in a similar manner to the system clipboard and provides a simple mechanism for applications to share common data.

The window device, allows a window, defined on the screen, to be associated with a sending OF a receiving port (or in some circumstances both). The sending port can be connected to a channel port and data can be streamed to the window and displayed. A variety of data formats are supported.

The DDE device can be opened to provide sending and receiving ports which are coupled to the dynamic data exchange mechanism. Through this device an aware application can control an application that supports DDE, or be itself controlled. Moreover, by establishing the appropriate channels, two remote DDE applications can be linked together.

The printer device, allows data to be sent to the system printer; only a single sending port is permitted.

The asynchronous serial device supports one sending port and multiple receiving ports and interfaces to RS232, RS422 and other serial communications.

A number of video and audio devices exist including: the video display and playback devices (supporting IBM/Intel ActionMedia II Adapter/A); the video capture device (supporting IBM M-Video Capture Adapter/A); the audio capture and playback devices (supporting IBM M-Audio Capture and Playback Adapter/A); and other specialised audio/video devices (such as H320 compliant codecs).

A number of aware applications are shipped as system utilities, and take advantage of these devices to offer general purpose end user functions, for collaborative working over a network.

Customisation

Customisation information for the support system 17 is stored in an appropriate platform-designated repository; for Windows and OS/2 these are the files called LAKES.INI and LAKESQOS.INI, formatted as a standard ASCII file, containing sections headed by an identifier, where keywords and their values are kept. Applications may also have their own additional initialisation filed. LAKES.INI contains standard section including information on configuration and start-up options, aware applications, devices and physical communications link; additionally application sections containing data specific to those applications may be present. LAKEQOS.INI contains quality of service information relating to physical links and data classes. Calls to access and update these files are provided in the API.

Resource Management

Collaborative working frequently requires that resources owned by a node, for example a printer device, can be shared with other nodes. Such resources are considered to be global resources and access is controlled through global tokens. Other resources are local to application sharing set, for example a shared pointer, and access to these is managed through application tokens.

A token owner determines the significance of a token and allocates it on request. At the discretion of the owner, queued requests may be permitted, and more than one concurrent holder of a particular token may be allowed. Token owners can optionally force holders to hand back tokens.

Global tokens share a common name space throughout the network, but since applications are expected to know the location of a globally available resource that they require, duplicate global token names are permitted. Facilities for the broadcasting of availability information are not provided; Instead, the call manager at the node with the global resource is responsible for resource management and therefore holds any global tokens. Global tokens may be held by an application instance on an exclusive or shared basis; token ownership, however, cannot be transferred to an application. Requests for a global token may be queued, with the queue being held above the API and managed by the node call manager. Access to global tokens is not restricted to a sharing application set.

Application token name space is restricted to the application sharing set. Tokens may be owned by any member application and ownership can be transferred. Application tokens may be held on an exclusive or shared basis and requests for tokens queued, with the queue being held above the API, and managed by the current application token owner.

Initialisation and Termination

The support system is started by running a LAKES.EXE file, which reads the profile data from the file LAKES.INI. The named call manager is started by the support system, which then registers itself as an aware application. A "set_call_manager" command then establishes this particular application as the call manager for that node. After this command, the support system is fully active at that node and is able to process incoming events and requests.

Aware applications can be initiated, either by the usual operating system procedures, such as a double click on an icon, or by a "launch" command, In the former case, the application will register with the support system, and in the return data receive its application and node handles. The call manager is notified of this registration, and supplied a handle to the application. In the latter case, the launching application is returned a handle to the application; this is only valid in very restricted circumstances until the launched application has registered with the support system. The return data provides the launched application with its application and node handles. Both the call manager and the application that specified the launch (if different) are notified accordingly.

Applications may revert to unaware application status by de-registering, the call manager being notified. All tokens held are released and the token owners are notified; all tokens owned become invalid. If the application is a member of an application sharing set it is removed and the other members notified of its departure. All ports created by the application are destroyed and the other applications owning ports to the affected channels are notified. All channels connected by the terminating application are welded and appropriate events raised at the end channel ports. Appropriate events are raised is necessary to the local call manager, plus the call managers of any nodes supporting a welded channel on behalf of the de-registering application. All open logical devices are closed; if any of the logical devices are connected to ports, destroyed as part of the de-registration process, then the whole connected channel is destroyed and the appropriate events raised.

A shutdown request can be issued by an application to close down the support system at a node in an orderly manner. This raises an event in the local call manager, and if the call manager accepts the request, corresponding shutdown events are raised at the other applications. These then prepare to close down and de-register, each de-registration being notified to the call manager. After the call manager has been notified that all the applications have de-registered, it too de-registers, to complete the shutdown.

The normal operation of the support system depends on the presence of the call manager. It is possible to replace the existing call manager with another, but the existing call manager may reject the request to do so.

Applications may join other applications in a sharing set by issuing the "share_app" request and naming an application sharing set; the normal case being where the target application and node are both specified by name. If an application at one node wants to share, by name, with an already existing instance of an application at another node, then the procedure is as follows. App 1 at node 1 issues the "share_app" request, specifying its own application and node handles as the source, and the names of app 2 and node 2 as the target. After verification with the call manager at node 1, an appropriate request is sent by the support system to the call manager at node 2. Providing this call manager accepts the request, this is then passed onto app 2, which can return a confirmation, assuming that it wishes to accept the share. This scheme provides for considerable flexibility in application sharing. Each call manager is aware of the share activity at its node, whether applications are the source or target of "share_app" requests.

A call manager has the following options on receipt of a share request: (i) handle the share itself (ii) transfer the share request (iii) reject the share (iv) launch a new application to handle the share (v) change the application and node name.

An application is not a member of an application sharing set when launched. When the source application issues a "share_app" request it has the option of naming the resulting sharing set; if it does not name the sharing set then the target must supply the name. After the share, both the target and the source join a new sharing set with this name. If either the source and/or the target were already members of a sharing set with this same name, then those sharing sets are merged with the newly created sharing set. Applications can leave a sharing set using the "unshare_app" request.

Data transmission and receipt

There are four mechanisms for applications to exchange data:

(i) User information strings

This is effectively a string passed to the support system as a parameter in an API call, which is then passed to the target application.

(ii) Signal function calls

These commands allow control information to be sent between applications, and are not restricted to those applications within a single application sharing set. Depending on the API call used, a reply will or will not be provided. Note that since this method uses the communications paths established between support systems on different nodes for their own data control flows, this technique is restricted to light data traffic.

(iii) Channel transmission

Channels are intended to support the transfer of volume data between applications. They provide the only means of controlling the transport characteristics. The use of channels is restricted to applications within the same application sharing set. When requesting the creation of a channel, the following information is specified: target application handle, channel set type and identifier, data class, maximum buffer size, user exit, node handle, quality of service, connect type, port event handler, user information. An alternative approach to channel creation is to take advantage of the channels created when applications with existing merged or serialised channel set are involved in application sharing.

Data is sent over channels by applications in packets; at the physical level the unit of data transmission is a frame. Certain data is spoilable, i.e. under certain conditions, if it cannot be delivered in time to meet the quality of service requirements, then it may be discarded. Some packets can be marked as spoilable, other packets as spoilers. A spoiler packet, if present, will cause the removal of those spoilable packets with which it has been associated. This technique supports for example the implementation of buffer management schemes for video, where certain packets are delta frame packets, and others are full frame packets. Selected sequences of delta frame packets can and must be deleted if a full frame is available.

(iv) logical devices

In certain specialised situations it is appropriate to use logical devices to exchange data. A single logical device can present ports to multiple applications; the logical device can then move data between the ports. This transport mechanism is not restricted to applications within the same sharing set and therefore overcomes a limitation placed on channels; however logical devices cannot span across nodes. Moreover any necessary quality of service support must be explicitly provided for by the particular logical device.

Negotiation of Quality of Service

Applications have different needs for quality of service and bandwidth negotiation and control. For examples, the following may be required:

pre-determined and constant quality of service, e.g. G.711 voice flexible requirements at channel creation, but constant thereafter, e.g. file transfer single application management of channel resources, e.g. an application communicating multiple data types such as video, voice, and data under restricted bandwidth conditions i.e. the video quality must be degraded intermittently to allow data traffic cross application management of channel resource, e.g. a group of applications communicating multiple data types under restricted bandwidth conditions and coordinating their activities as the priorities change for different types of data traffic Certain applications have fixed quality of service requirements for the channels needed to communicate with other applications. In these cases the channels may be established directly, using a "create_channel" request. Parameters on this request identify the receiving application(s) and both the channel and the sending port characteristics. If the resources are available, and the receiving applications accept the request, then the channel will be created.

Some applications are more flexible in their quality of service requirements and need to determine what is available to a particular node and then use this information in setting the parameters of the "create_channel" request. This is accomplished through a "query_resource" command, specifying the target node. The subsequent "create_channel" can request an equal or lower quality of service and expect the request to be satisfied, if there is not competition for the communications resource.

Other applications have flexible quality of service requirements, but need to compromise the specification over a number of channels. This requires the application to reserve resources and then allocate from this reserved pool.

This is achieved by means of a "claim_resource" command specifying a resource set identifier, a quality of service, and the target node. This has the effect of reserving that resource and associating it with the specified identifier. This identifier can then be specified in a subsequent "create_channel" command, in which case the resources are allocated from those reserves. The "query_resource" command can be used to determine remaining resources in a resource set.

Certain applications need to dynamically change their channel characteristics during execution; for example, available bandwidth must be re-allocated across channels. This can be done through a "change_channel" request, specifying a resource set identifier. The resources are given to, or taken from, those resources associated with that identifier. This technique allows, for example, a fixed resource to be secured for an application to application communication, and then re-allocated dynamically according to the traffic e.g. video bandwidth can be temporarily reduced to allow faster file transfer.

Resource set identifiers are local to an application instance and contain resources appropriate to one particular quality of service.

Networks

An application can specify quality of service characteristics when creating a channel or when reserving resource for later allocation to channels. Channels are mapped onto physical links; the data packets sent by applications over logical channels being implemented as data frames sent over links.

Links are characterised by order, whether switched or fixed, their time-out parameters and by their quality of service characteristics. Order determines the order in which the support system will attempt to use the links for data transmission, assuming that there is a choice of links available with suitable data transmission characteristics. Order, switched or fixed link, and time-out parameters are specified in the initialisation files.

Link descriptions, optionally including quality of service characteristics, are stored in a link data base external to the support system. Defaults for the quality of service information are contained in the initialisation files. The data base is accessed by an installation supplied executable, which is called by the support program. The quality of service parameters relevant to digital links are: throughput, latency, jitter, frame size, frame error rate, frame re-transmission time, compression hints, encryption.

The key parameters used to characterise the quality of service required by applications over logical channels are: througput, latency, jitter, packet size, packet error rate, encryption, compression hints, priority. Most of these mirror their link counterparts with the exception of channel priority, which specifies the order in which the support system will attempt to service data tranmissions over all, the channels at that node, assuming that there is resource contention between the channels, and packet error rate, which specifies an acceptable random proportion of packets that need not be delivered due to loss or error in transmission (there is no guaranteee that the support system will conform to such a limitation; specifying zero here results in the application being notified of any failures).

The above information is used to determine what links to use for application to application communication. A data base containing information such as type of link and service characteristics can be accessed via the resources interface, whilst the channel information is obtained from the application. The support system then selects an appropriate link to use based upon matching the fully resolved channel requirements with the fully resolved available links information, taking account of (a) the need to exchange control information between the support systems at different nodes, and (b) the order values associated with the links.

Both software and hardware compression and encryption are supported. Hardware features on a physical link are accommodated by considering the various combination of options as different available links types, each associated with particular transport characteristics. Software routines can also be used, but these will not be invoked if specific latency and jitter requirements have been set.

In order that the complex process of route selection can be performed outside the support system if necessary, the RLI calls used to retrieve link information also supply all the required channel quality of service characteristics. Through this mechanism, an external routine can itself determine the appropriate route and return that route to the support system. An example of the need for this might be that transmission costs vary with the time of day.

When applications with channels share with each other, if their existing channels belong to the same named merged or serialized channel set, the support systems create additional channels. An attempt is made to establish these new channels from each sending port, with a quality of service appropriate to that port, i.e. an implicitly created channel will attempt to have characteristics such that it can transport satisfactorily any data packets expected to be sent down any one of the pre-existing channels from that port. In some cases, due to restrictions imposed by the capabilities of the available physical links, it will not be possible to create channels with such characteristics. However, in all cases a channel will be created, and it is the responsibility of the application program to query the channel capabilities, if these are likely to be significant.

A channel between nodes may be realised over a single physical link, or over multiple, serially connected links. The physical connection existing between two nodes is termed a route.

a) Permanent Digital Networks

The support system operates with either dedicated of shared, switched or permanent, digital links between nodes. Shared links have unpredictable latency and bandwidth characteristics, unless bandwidth management facilities are being employed. Such features give permanent links many of the characteristics of switched connections.

b) Permanent Analogue Networks

The support system supports analogue communications in a very similar way to digital communications, in those situations where:

analogue links exist between nodes.

connectivity and routing at each node can be controlled by the system at that node.

a digital control channel exists between the nodes.

Analogue channels are logically dedicated uni-directional communication links established by the sending application, and they may terminate in more than one receiving application. They may be distinguished from digital channels by their quality of service characteristics. Ports terminating these analogue channels have a null connect type since they cannot supply or receive data from applications. Only standard or merged channels may be established; serialising and synchronising channel sets are not permitted.

Logical devices can present analogue ports when opened; thus a video player device can be used as a source of analogue video and may be connected to an analogue channel through an API command. The direct connection of analogue and digital channels is not permitted; however certain devices e.g. a codec device provide both analogue and digital ports when opened and can be used to effect such a coupling.

c) Switched Digital Networks

Switched digital networks can be used by the support system for inter-node communication without exposing the switched nature of the connection. Information accessed via the resources interface is used by the system to decide when to terminate an inactive switched connection.

Equipment, such as digital telephones, attached to a switched network, are accessed by applications in one of two ways. If a simple connection is all that is required then the telephone may be regarded as a virtual phone application executing at a virtual node. The connection to the phone is initiated by a share request specifying the virtual phone as the target, resulting in a telephone call established between a telephone associated with the local node and a remote telephone. Incoming telephone calls can be handled in the same way, i.e. as a share request.

Alternatively, the phone may be accessed as a logical device. Thus an ISDN phone device may be opened to present receiving and sending ports, with an associated event or command connect type; dialling, and other control functions, are implemented through "signal_port" commands. Third party connection between digital telephone equipment is similarly affected through commands to an appropriate device; this may be physically implemented through commands to the local switch.

Potentially active multi-point control units, which dynamically modify data or routing, for example, an MCU implementing the CCITT recommendations for audio-visual communication, may also appear as devices to applications.

d) Switched Analogue Networks

Analogue telephones and other equipment, attached to the public switched network, may be accessed in a similar manner to digital telephones, ec either as a virtual phone application executing at a virtual node, or through a logical device. A PSTN telephone logical device can be opened to present a port, with a null connect type i.e. it cannot supply or receive data from an application. "Signal_port" commands are used to control the device. First party connection can be implemented through a modem injecting dialling tones into the local line; third party connection, and multi-way calls through commands to the local switch.

Interfacing to Unaware Applications

The support system provides facilities which permit unaware applications to be used for collaborative working. An aware application supplies the user interface dialogue and interacts with the particular unaware application via virtual devices. This same aware application then communicates with a related aware application at the remote node to pass the information to the remote user. Several such applications are included as general purpose utilities.

Figure 11:
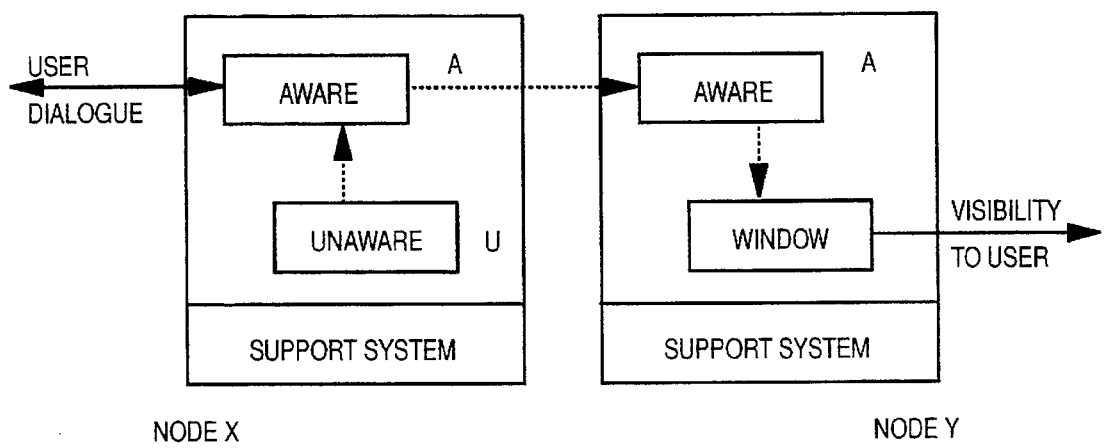
FIG. 11 shows how an application window at one node may be displayed at a remote node.

A common requirement is for an application window of an unaware application to be displayed at a remote node as illustrated in FIG. 11. The implementation is as follows: an aware application $A_X$ at node X dialogues with the user to identify the window required, assumed here to be the unaware application $U_X$. $A_X$ then opens a window display logical device, with the appropriate parameters, the effect of which is to generate a port through which copies of the window data are made available. $A_X$ connects this to a port on a channel leading to an aware application $A_Y$ at the destination node Y. $A_Y$ then opens a real window logical device, and connects the port created to the receiving channel port. Data flows between the nodes, and is displayed at Y, without the further intervention of either application $A_X$ or $A_Y$. Options available on the windows logical device open request allow the application to specify such parameters as bits/pixel, frequency of update and data format (e.g. text, bit map and option of included pointer position).

Remote pointers over the shared window of the unaware application $U_X$ can be handled by $A_X$ and $A_Y$ setting up a channel suitable for the interactive data class. The real pointer on each node is then used for identifying features in the shared window; this can be achieved with an algorithm such as: each user wishing to point moves his pointer into the shared window; when pointers are in the shared window their co-ordinates are transmitted to the sharing applications. The combined co-ordinates are then used to control the pointers; the effect is that whoever moves the cursor last, positions all the linked pointers.

Remote printing and remote file generating are similarly accomplished through logical devices. In the case of printing, a printer emulator device is installed at the source node. When it is selected as the printer device by the user, the effect is to redirect the printer data stream to a port. This is then connected, via the aware applications, to a real printer device at the destination node. This general technique is extended for a range of other capabilities such as dynamic data exchange (DDE) and the system clipboard.

Remote control of an application or system is not supported directly; however an application to perform remote control can be implemented above the API, with Lakes providing the group communication and multi-media data transmission facilities.

Programming Considerations a) Program Call Types and Structure

Figure 12:
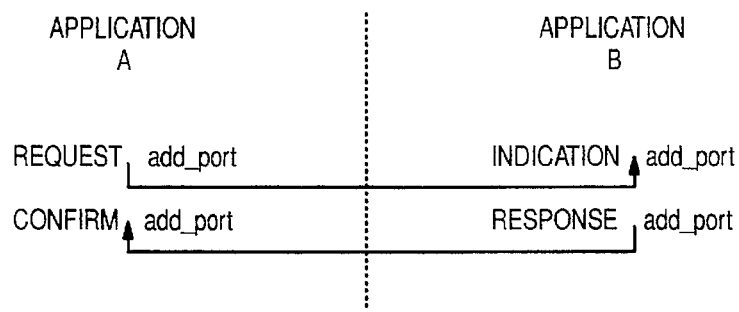
FIG. 12 illustrates the sequence of events resulting from a call to the support structure.

Program calls to the API generally result in a request, indication, response, confirm sequence. An application A, requiring a service, requests that service, supplying the appropriate parameters. The request usually requires another application B being made aware of that request; the mechanism for this is an unsolicited event which appears as an indication at the application B. The action taken by B to the indication event is given to the support system as a response, with appropriate data. The system passes the information back to application A as a confirm event. This is illustrated in FIG. 12 using the example of the sequence involved in adding a port to a channel (for simplicity no parameters are shown).

An API call may be either synchronous or asynchronous, depending upon the particular function; a synchronous call returns control when the request is complete, an asynchronous call returns control immediately. To help applications monitor the progress of an asynchronous call, these calls contain a reference identifier. This identifier is valid until the request has been satisfied and queries can be issued to obtain status; this same identifier can also be used to cancel a pending request. All calls pass back a return code denoting call status.

b) Addressability

An application requests addressability to nodes by using the node name. This name is first passed to the local call manager which has the option to modify it. The resultant name is then used by the support system to determine connectivity information, this requires access to the externally held network and user data base, using the resources interface. Thus the support system determines physical addressability for that name through queries to the network configuration via the resources interface 29, FIG. 2. A node handle is returned to the application to reflect this resolution of the node name. Addressability from one application to another application requires the resolution of an application name. If both applications are at the same node, the local call manager can perform this resolution, else both call managers must be involved. This resolution results in the target application being identified to the source application by an application handle. Calls using application names are always passed to the call manager for resolution; calls using application handles go direct to the specified application.

When an application creates a channel, addressability to the channel port is provided through the system returning a port handle. Similarly the opening of a logical device results in a device port handle.

All handles are guaranteed to be unique to the using application but are not valid if passed to other applications or nodes.

c) Event Classes and Event Handlers

API requests are provided to assist with event and call control. A "begin_monitor" request allows an application to monitor requests and events at a node, the scope of the monitoring being controlled by the choice of monitor class from one of the following:

All: all events or API calls

Application Signalling: signal events/API calls

Call_manager: call manager events/API calls.

Data: data transmission events/API calls.

Device: device events/API calls.

Monitor: monitor events/API calls.

Port: port and channel events/API calls.

Profile: profile events/API calls.

Share: share and unshare events/API calls.

Synchronisation: synchronisation events/API calls.

Token: token events/API calls.

The scope of the monitoring is controlled at the event or API class level. Events can be monitored with or without data. Monitoring is terminated with an "end_monitor" command. Applications can also use the "enable_events" and "disable_events" commands to determine which events they are to receive. The valid event classes are:

All: all events

Device: device events

Port: port and channel events

Profile: profile events or API calls

Sharing: share request events or API calls

A default event handler generates responses for all events not explicitly handled via an applications. Events are handled by registered event handles: four types can exist in aware applications:

Application: this is the primary event handler thant handles the main events related to the general operation of an aware application. This event handler must be present in all aware applications, including a call manager.

Call_manager: this is somewhat specialised and handles those events concerned with application registration, name resolution, shutdown requests, passive nodes, call manager transfer, and global token status. This event handler must be present in all call managers.

Port_event handler: more than one port event handler may be present and each handles data communications related events.

Monitor: this is optionally present and handles all monitoring of events.

d) Other Programming Facilities

All channel ports can be associated with a user exit to monitor data traffic or process data. For a sending port, the user exit is invoked immediately prior to the data being transmitted to the receiving nodes; for a receiving port, the user exit is invoked immediately the data arrives at the receiving port but prior to the data being presented to the receiving application. Specification of a user exit routine on ports which have been connected may impact performance because the data must be surfaced to the user exit.

A full set of queries are provided to avoid applications needing to keep track of status information.

Application program debugging can be simplified by initially running collaborating applications at a single node; this avoiding physical networks being required during initial stages of program development.

No user interface code exists below the API; all user interactions are the responsibility of either the application program, or the code servicing requests across the resources interface.

Utilities

A number of pre-programmed utilities are provided in order to immediately provide useful function to end users and reduce the programming effort required to develop new collaborative applications, by providing common functions accessible through a command interface.

Figure 13:
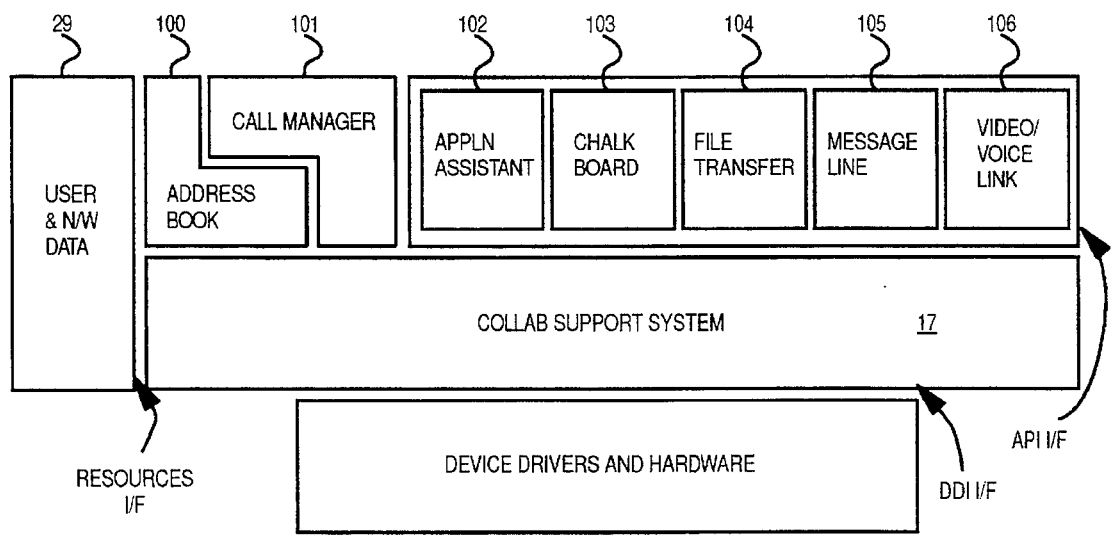
FIG. 13 illustrates exemplary utilities provided on top of the collaborative support system.

All the utilities are replaceable application programs. The structure of the provided utilities is shown below in FIG. 13. The supplied utilities install as a program group and are designed as a suite of applications which work together. The major utility functions can be invoked from other application programs by means of the "signal" command, as well as directly by the user.

a) Directory and Call Management i) Address Book

The address book utility 100 allows an end user to add, delete and update directory and connectivity information. The data is stored in a simple file structure which is easily edited by standard programs, although a mechanism is provided to interface with other potentially more extensive and complex address data-bases. User data can be grouped into logical collections known as phone books. The utility interfaces directly to the call manager; it also responds to queries through the resources interface.

ii) Call Manager

The call manager utility 101 implements the concept of a call. A call refers to a group of users collaborating by using shared applications. More than one call can exist at any time, users can be in more than one simultaneous call, and the same applications can be executed in multiple calls. For example: the users A, B and C can be in a call, x, to review a document; all may using voice communication with each other, A and B may also have a video link, and A and C may also have a shared chalkboard. Meanwhile, A, B and D may be in a second call y, to review a second document; with A and D using a chalkboard, and B and D using voice links.

The call concept does not exist in the API but it is implemented by the call manager through application sharing sets. Providing this support avoids the need for aware applications to be involved in call set-up or tear-down and provides clear separation of call management and application programming. The call manager provides dialogues for an end user to select names from the address book and logically establish a multi-point call. Parties can be added and deleted dynamically. Options provided include auto-answer and call barring. One call is deemed to be the current active call and it is the one to which shared applications are normally added when invoked. The current active call may be relegated to the background whilst another call is set-up.

User Utilities i) Application Assistant

This utility implements the following functions for users in a call:

direct mirroring of an existing application window, either as a snapshot or continuously, and has the system pointing device enabled as a remote pointer.

system clipboard support i.e. the ability for the contents of a system clipboard at one node to be optionally shared and/or viewed at other nodes.

remote DDE links able to be established between applications at different nodes.

redirection of printing to printers at other nodes.

ii) Chalkboard

The chalkboard 103 implements a common drawing area with two image planes, which is accessible to all users in a call. The background plane can be loaded from bit-map files, the system clipboard, or from the contents of an application window. The foreground plane can be used for interactive annotation using a range of simple text and graphics tools. Remote pointers over the chalkboard are also supported.

iii) File Transfer

File transfer 104 allows the transmission of files between users in a call. One or more files can be transferred, the files can be sent with comments, and the original file names are made available to the destination. The receiving node is in full control of file receipt and file naming.

iv Message Line

Message line 105 provides immediate sharing of text data between users in a call. Multiple simultaneous users are permitted; each participant sees all the exchanged messages, and in the same sequence. The message utility also logs activity during the call; such as calls set-up and terminated, and files transferred. In an actual embodiment this utility is provided as part of the call manager.

v) Video/Voice Link

This utility 106 allows the establishment of video and voice links between users in a call. The precise function available is dependent upon the capabilities of the physical network and the workstation hardware support.

Standards

The overall architecture is intended to support a broad range of collaborative applications. The interface is set at as high a level as possible, consistent with not imposing any significant restraints on the range of application models that may be implemented. The nature of the transport networks involved are totally bidden below the API. This means that an application is completely unaware of the network routing (e.g. direct or indirect), and the network types involved (e.g. single or multiple links, switched or fixed connections). A consequence of this approach is that the applications must be written expecting that requests, for example for a particular communications quality of service, may fail, since the underlying network may not have the required capability.

An agent philosophy has been implemented so that third party applications can be sued to act on behalf of other applications. This permits call manager, telephony, and switching applications to be developed. The current state of technology requires that analog networks and devices should be supported. It is attempted to treat analog networks like digital networks, in order to ease application migration.

At the API level, one of the key concepts exposed is that of applications sharing sets. Applications are expected to collaborate with other applications, and the mechanism for this collaboration is that they join each other in named application sharing sets. The essence of such an application sharing set is that all set members receive information on the status of all the other members; joining a set is the way in which applications declare those in which they have an interest. The concept of the call by contrast exists above the API, and in particular at the call manager. It is possible for different call managers to have different call models.

Alongside the application sharing set, the channel is the other fundamental concept in the architecture. Uni-directional channels are used as the basic communications building block to efficiently support both broadcast and two-way communications. The channels are established by the sending application, and accepted by the receiving application, because only the sending application can be aware of the properties of the data which dictate how it should be transmitted. Both applications can independently control the format to be supplied or received to or from their respective ports. Multiple logical channels, for each kind of data flow, allow the support system to allocate the traffic appropriately to the underlying transport network; moreover it lets other applications have data presented to them in separated, homogeneous flows, each individually described. Additionally this split of the inter-application traffic into individual data types, allow the support system to offer data conversion facilities.

Connections and welding of channels allows the transport of data to drop below the API so that the application is no longer involved in moving the data. The support system has the option, in some cases, of affecting the connection, either at a very low level at that node, or re-routing the flow away from that node.

The support system architecture is designed to permit inter-working between different computer platforms, operate over varied communications networks, and support relevant communication and data standards.

The separation of data traffic into logical uni-directional flows of homogeneous data, simplifies the mapping on to a mixed network and allows the use of multiple physical links, of different capabilities, between the nodes. Data multiplexing is handled below the application and can be implemented in different ways depending upon the underlying transport mechanism, e.g. by a combination of: allocating each logical flow to an individual physical link; multiplexing all the data in the support layer; or by leaving aspects of the multiplexing to a device driver. Through this means voice, video and data traffic, for instance, can be sent over multiple channels, over iso-LAN or iso-Ethernet, or over ISDN using the CCITT H320 recommendations. The quality of service requirements impose conditions on the required transport facilities; thus voice and video typically require dedicated physical links or shared links with isochronous capability, implemented through schemes involving priority and bandwidth management.

The separate logical data paths provided by channels, with their associated data types, ease inter-application operation because the data components are presented individually, with their nature and format independently available. Through this mechanism, a wide range of existing standards for voice, video, image, file transfer, and coded data can be supported, with the potential for the support system to perform data conversions in the network. The system also provides a separate data class for the interactive objects commonly used in collaborative applications, such as remote pointers, cursors and gestures.

Overview of the API Commands

The principal facilities offered by the API calls are detailed below. The syntax and parameters of the actual calls is not described because the intent is only to give an overview of the scope.

API Function Requests
  Session and application sharing
    cancel_request: cancels a previous asynchronous request if that request is not already satisfied,
    deregister_app: issued by an application instance to terminate its use of the API,
    launch_app: issued by an application to invoke another application,
    register_app: identifies the issuing application instance as a wire and establishes the application event handler.
    set_call_manager: identifies the call manager for that node and establishes the call manager event handler.
    share_app: issued by an application instance to request the sharing of one application with another application,
    shutdown_node: issued by an application instance to request the shutting down of the support system at its local node,
    unshare_app: issued by an application instance to terminate the sharing of one application instance with another application,
  Devices and Ports
    add_channel: adds, in a specified application instance, another channel to a specified sending port.
    change_channel: changes the specified channel characteristics.
    change_device_characteristics: changes the specified device characteristics.
    change_port: changes the specified port characteristics.
    claim_resource: call to a resource manager for resources associated with a particular quality of service.
    close_device_port: closes the associated port on the defined device.
    connect_ports: connects a specified receiving port to a specified sending port.
    create_channel: creates a data transmission channel consisting of a sending port at the issuing application and a receiving port at the specified target application.
    disconnect_ports: disconnects the specified receiving port from the specified sending port,
    open_device_port: opens a port on a defined device.
    remove_channel: removes the channel associated with the specified receiving port and the specified sending port.
    request_resource: enquiry to a resource manager for resources associated with a particular quality of service.
    resume_port: resumes data transmission through the specified port.
    signal_port: transmits a control string through a specified port.
    suspend_port: suspends data transmission through the specified port after draining or flushing any data not yet received.
    weld_connection: makes the connection of the specified receiving port and the sending port permanent.
  Data Transmission and Receipt
    receive_data: receives data from the specified receiving command port.
    send_data: sends data asynchronously through the specified sending port. Various transmission acknowledgements may be requested.
    signal: transmits support system or application defined control data over a support system established control channel to a specified application instance.
    signal_app_with_reply: transmits support system or application defined control data over a support system established control channel to a specified application instance, and returns the response data.
    start_sync: starts the synchronisation of data received through receiving ports associated with a specified channel set.
    stop_sync: stops the synchronisation of data for all receiving ports associated with a specified channel set.
  Token Management
    get_token: requests the immediate holding of the specified global or application token either exclusively or in a shared manner.
    give_token: gives the specified token to the specified requester.
    qget_token: requests either the holding of the specified global or application token either exclusively or in a shared manner, or, if the token is not available, the joining of a request queue maintained by the current owner.
    reclaim_token: forces the specified token held by the specified application instance to be immediately released back to the current owner of the token.
    refuse_token: refuses the specified token to the specified requester.
    release_token: releases the specified held token back to the current owner.
    return_token: requests that the specified application instance holding the specified token should return the token back to the current owner as soon as possible.
    set_token_owner: sets the owner of the specified token to the specified application instance.
  Event Control
    begin_monitor: causes special monitoring events identifying each occurrence of an API call, and/or a normal event to be presented to the specified monitoring event handler.
    default_event_handler: returns default responses for all events that an application programme does not wish to handle explicitly.
    disable_events: stops events of the specified event class being passed to the event handler of the issuing application instance.
    enable_events: allows events of the specified event class to be passed to the event handler of the issuing application instance.
    end_monitor: stops the special monitoring events identifying each occurrence of an API call, and/or a normal event being presented.
  Profile Management
    read_profile_string: returns a character string of a specified keyword in a specified section from a profile file.
    write_profile_string: copies a character string to a specified keyword in a specified section the profile file.

API Queries
  query_address: returns the completed full address of an application instances belonging to a named sharing set.
  query_application_status: returns status of an application (unaware, aware or call manager).
  query_channel_characteristics: returns the channel characteristics of the channel associated with the specified sending and receiving ports.
  query_channel_set: returns the handles of all the ports in a specified channel set.
  query_device_characteristics: returns the device characteristics of the specified device.
  query_device_status: returns the status of the specified device.
  query_monitor: returns the class of functions or events currently being passed to the monitor event handler.
  query_port_characteristics: returns the characteristics of the specified port.
  query_port_status: returns the status of the specified port.
  query_resource: returns the resources available in the specified resource set.
  query_sharing_set: returns the sharing set identifiers for an application instance.
  query_token_holder: returns the owner (application tokens only) and holder of a token.
  query_token_state: returns the state of the specified token.
API Events
  Call Manager Events
    APP_DEREGISTERED: an event to the local call manager when the application instance terminates its use of the API.
    APP-REGISTERED: an event to the local call manager when an application initializes its use of the API.
    CALL_MANAGER_ERROR: an error has occurred which affects the call manager.
    CALL_MANAGER_REQUEST: an event to the local call manager indicating that another local application has issued a set_call_manager function request.
    NODE_SHUTDOWN_REQUEST: a request for the support system to shut down.
    PASSIVE_NODE_RELEASED: an indication that the resources allocated to allow the node to support passive requests may be released.
    PASSIVE_NODE_REQUEST: a request for the node to allocate resources to support a passive request.
    SHARE_REQUEST: a request to share with a named application.
    TOKEN_STATUS_REQUEST: a request for status of a global token.
  Application Events
    APP_SIGNAL: a signal has been received.
    APP_SIGNAL_REJECTED: a signal has been rejected.
    APP_SIGNAL_WITH_REPLY: a signal_with_reply has been received.
    APP_SIGNAL_TRANSFERRED: a signal has been transferred.
    APP_UNSHARE_REQUEST: a third party local application has requested that the recipient leave an application sharing set.
    APP_UNSHARED: a notification the issuer is leaving an application sharing set has been received.
    APP_ERROR: a related application error has been detected.
    NODE_SHUTDOWN: a shut down has been initiated.
    PORT_REMOVED: a confirmation that a port has been removed.
    PORT_REQUEST: a request to add a receiving port.
    RESOURCE CLAIM: raised whenever an application claims its quality of service resources.
    RESOURCE REQUEST: raised whenever an application requests its quality of services resources.
    PROFILE_CHANGED: an indication that the LAKES.INI or LAKESQOS.INI file has been changed.
    SHARE_CONFIRMED: a confirmation that a share request had processed has been received.
    SHARE_REJECTED: a request to share has been rejected.
    SHARE_REQUEST: a request to share has been received.
    SHARE_TRANSFERRED: a request to share has been transferred.
    TOKEN_CANCEL_REQUEST: a request to cancel a queued token request has been received.
    TOKEN_GIVEN: a token has been given to a requester.
    TOKEN_QREQUEST: a request to hold a token or to join the queue if the token is unavailable.
    TOKEN_RECLAIMED: a token has been taken away by owner.
    TOKEN_RECLAIMED: a token has been taken away by owner.
    TOKEN_REFUSED: a request for token has been refused.
    TOKEN_REQUEST: a request to hold a token.
    TOKEN_RETURN_REQUEST: the owner of the token requires that the token be returned as soon as possible.
  Device and Port Events
    CHANNEL CHANGED: some channel characteristics have been changed.
    CHANNEL_CONFIRMED: a new channel has been created.
    CHANNEL_DESTROYED: a channel has been destroyed.
    CHANNEL_REJECTED: a channel has not been created.
    CONNECTION_WELDED: a wel connection notification has been received.
    DATA_AVAILABLE: data is available at a receiving port.
    DATA_CONFIRMED: a confirmation of a data transmission has been received, or an estimate of the progress of a data transmission.
    DATA_REQUESTED: data is requested from a sending port.
    DEVICE_INFORMATION: an event raised to the sending port event handler of the application instance that is to supply device information.
    PORT_ERROR: a port error has been detected.
    PORT_RESUME_REQUEST: a resume port request has been received.
    PORT_SIGNALLED: a signal port event has been received.
    PORT_SUSPEND_REQUEST: a suspend port request has been received.
    PORT_SYNC_REQUEST: a request to adjust the synchronising control has been received.

Monitor Control Events
 EVENT_MONITORED: a notification of function request and event activities has been received.

Channel, Port and Link Characteristics

Channel Characteristics

The following parameters are associated with a channel and are established on the creat_channel and add_channel requests.

--- quality_of_service:
  signal type (analog or digital)
  throughput
  latency
  jitter
  lateness
  priority
  compression hints
  encryption
    Quality of service characteristics are associated through data type and subtype in the LAKESQOS.INI file, but can be specified explicitly. They may be left undefinedl; this allows channels to be created whose operational characteristics depend upon the resources available when data is being sent down the channel.
channel_type:
  standard
  merged
  serialised
  synchronised
channel_set_id:
  identifier

---

Port Characteristics

The following parameters are associated with a port; all except port-type are defined explicitly; sending ports specify these parameters on the create_channel request, receiving ports specify them on the PORT_REQUEST response.

--- connect_type:
  command
  event
  null
event_handler:
port_type:
  sending
  receiving
data_class:
  data type
  data sub-type
user_exit:
user_information:

---

Link Characteristics

The following quality of service parameters are associated with a physical link and are specified in the network data base accessed via the link locator, or obtained as defaults from the LAKESQOS.INI file.

signal type (analog or digital)
  throughput
  latency
  jitter
  frame size
  frame error rate
  frame re-transmission time
  compression hints
  encryption Support System Structure Referring back to the support system structure as illustrated in FIG. 10, the various tasks of the components thereof will now be described in more detail. The application manager 223 acts as an interface to the rest of the support system, providing an entry point for all the API calls which are then distributed to the appropriate component after a certain amount of parameter verification. It is also used to scan incoming calls/outgoing events if monitoring is required (see below).

The application manager is responsible for calling back the application at the event handler specified when a channel is created. The events will be those raised at the sending port if the local application created the channel, or then receiving port if the remote application created the channel. When creating a port, the application manager passes the address of an event queue handler which will handle all the events for a particular application and place them in a queue. Then, some mechanism such as a dispatch thread continuously reading the event queue sends the event to the application's event handler.

The channel manager 227 has five sub-components: a channel supervisor, responsible for starting and shutting down all the other components; a control channel sub-component, which handles control channel communications between support systems at different nodes; a data channel sub-component, which handles all other non-control channel data communications; a node manager, which creates, destroys, and maintains node handles and sets of node handles; and a port manager, which creates, destroys, and manipulates ports and does port query functions.

The resource manager 225 is the first component in the support system to get control. It is responsible for initialising all the other components, as well as interfacing to any address book or route selection facilities. The token manager 224, as its name suggests, is responsible for the logging and management of tokens, both global and application tokens (global tokens are owned by the respective call manager components; by contrast application tokens are owned by a node in a sharing set).

The device manager 224 is responsible for interactions between the support system and devices, and in particular performs the following functions: resolving devices names to fully qualified path etc, loading appropriate dynamic link library (DLL), generating a record containing the port number, port handler and event word, calling the initialisation entry point, and resolving all entry handles in the DLL to physical address for the application call manager. The signal manager 226 is responsible for signalling to applications (with or without reply) and to ports.

Channel and Port Descriptions a) Channel Description

The following parameters are associated with a channel and are specified on the "create_channel" request.

--- quality_of_service:
  throughput (e.g. bits/sec)
  channel priority
channel_type:
  standard
  merged
  serialised
  synchronised
channel_set_id:
  identifier
encryption_parameters:
compression_hints:

--- b) Port Description

The following parameters are associated with a port. Sending ports specify these parameters on the "create_channel" request, receiving ports on the response.

```
                connect_type:
                    buffered
                    event
                    null
                event_handler:
                port_type:
                    sending
                    receiving
                user_exit:
                user_information:
                data_class
                    audio
                    composite audio/video
                    file
                    interactive
                    batch
                    video
```

Channels and Ports

Having now described the overall operation of the collaborative application support system, various channel and port operations will now be described in more detail. The API command which creates channels and ports is "create_channel".

The create_channel function creates a channel with specified characteristics from the issuing application to the target application.

Parameters specified in the create_channel command are:—

| | |
|---|---|
| async_id | a user supplied reference id by which this call and all events related to this call may be identified. This parameter can not be zero. |
| target_application | pointer to a structure containing the short address of the target application. |
| sharing_set_id | a user defined sharing set name in the channel is to be created |
| channel_type | the type of channel set association:0<br>STANDARD<br>MERGED<br>SERIALISED<br>SYNCHRONISED |
| channel_set_id | a user defined identifier of the channel set with which the created ports should be associated. |
| quality_of_service | pointer to a structure containing quality of service parameters |
| data_class | pointer to a structure containing two fields describing the type and sub-type of data that can be sent through the created sending port |
| max_buffer_size | maximum buffer size used on a send_data |
| connect_type | connect type of the sending port:-<br>NULL<br>EVENT<br>BUFFERED |
| event_handler | address of the event handler to be invoked to handle incoming events for the created port. |
| user_event_word | A user specified data pointer passed to the port event handler on all events relating to this port. |
| user_exit | address of the user exit in the issuing application to be invoked whenever data is transmitted through the sending port. |
| user_info | user supplied information passed on the PORT_REQUEST event to the remote application. |
| startup_mode | specifies that the channel is created in a suspended or a started state. |

Return Codes from the create-channel/function include RC_OK indicating that the operation completed successfully and a number of failure codes.

This function call is used to create a unidirectional logical channel. The channel is created between the issuing application and the target_application. A sending port is created in the issuing application and a receiving port is created in the target application (ref. FIG. 8).

As a result of the create_channel function call the remote application will get a PORT_REQUEST event raised through its initialise event handler, at which point it can accept or reject the request. A CHANNEL$_{13}$ CONFIRMED event is raised through the applications initialise event handler giving the PORT_REQUEST response.

The channel_type defines the four types of channels described earlier, namely, Standard, Merged, Serialised and Synchronised.

The async_id parameter value is application defined, (it may be used by the cancel function call) and is returned at the local end on the CHANNEL_CONFIRMED or CHANNEL_REJECTED event. However the PORT_REQUEST, CHANNEL_CONFIRMED or CHANNEL_REJECTED events at the remote end will have an async_id value of zero.

channel_set_id, is a user defined identifier that informs the system that a logical channel belongs to a set of channels. The channel_set_id must be unique within an application sharing set, any channel that is to be part of the set must specify the same identifier. This may only be null if the channel_type is specified as STANDARD.

The quality of service parameter is a structure containing the identifier of a resource set and the desired quality of service resources. If the resource set identifier is not null then the specified resources will be obtained from this set. If the resource set identifier is null then the resources will be obtained from the system available resources. For a discussion of setting up a resource set see the definition of the reserve_resource function call.

The connect_type parameter specifies how the data is to be given to or received from the system i.e. Null, Event or Buffered, as described earlier.

Figure 14:
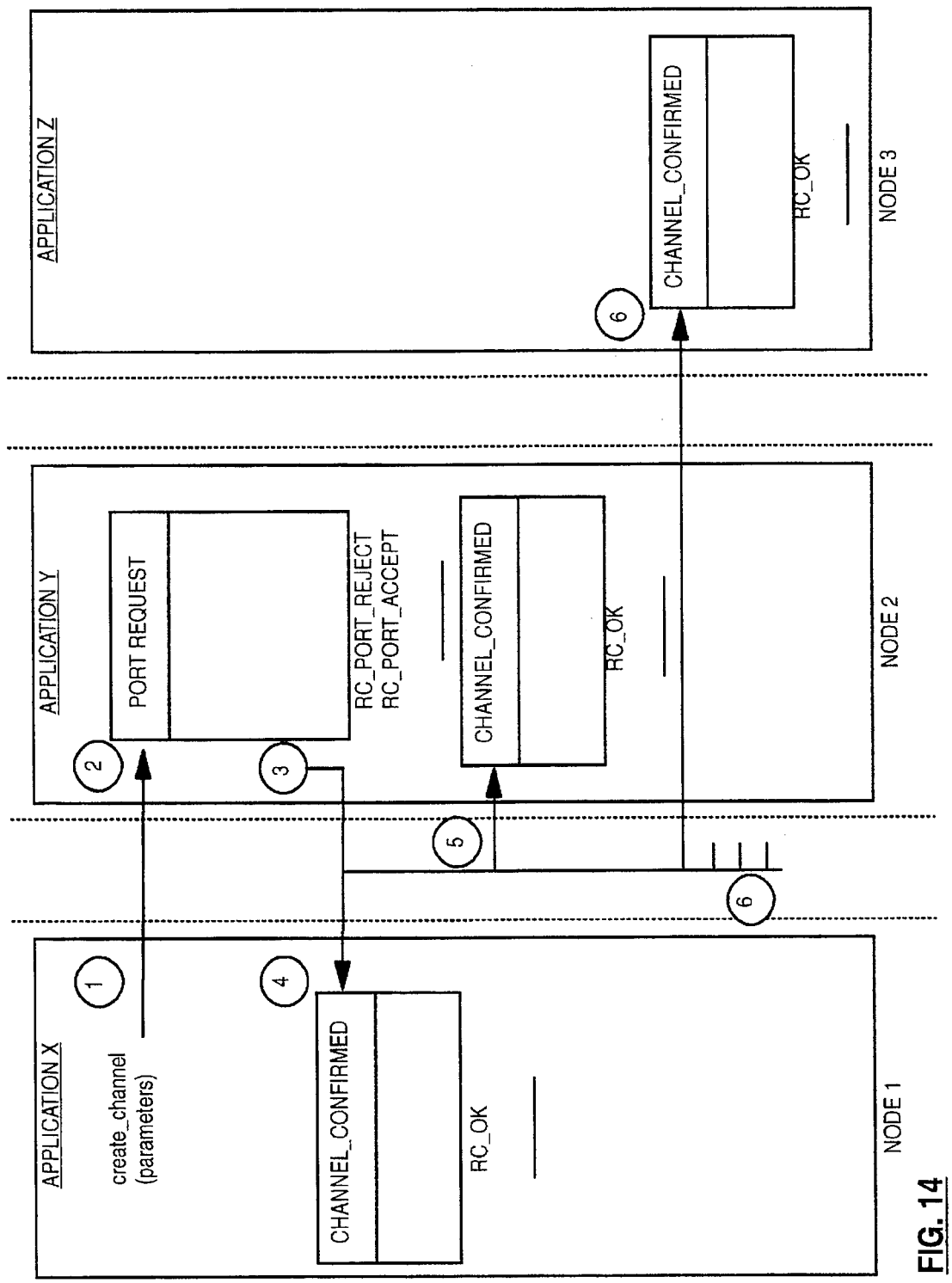
FIG. 14 illustrates the flow of requests for the creation of data channels and their associated ports.

Typical flows for the creation of data channels and their associated ports are illustrated in FIG. 14 and explained by the following notes.

| | |
|---|---|
| Step 1 | Initially, Application X in Node 1 issues an asynchronous create_channel request to the support system to create a data channel consisting of sending port in application X and a receiving port in application Y in Node 2. |
| Step 2 | The support system raises a PORT_REQUEST to Y's initialise event handler. Note that in the case where the create_channel is requesting the creation of a merged or serialised channel using already created ports then no PORT REQUEST event is raised. The PORT REQUEST includes the sending port handle (full address), the receiving port handle and a pointer to the full address of the source application X. |
| Sept 3 | Y's initialise event handler either rejects (RC_PORT_REJECT) the request or accepts (RC_PORT_ACCEPT) the request. If the request is accepted then Y's event handler must fill in the fields in the event data with the parameters needed in order to build the receiving port. |
| Step 4 | If Y returns a RC_PORT_REJECT then the system will raise a CHANNEL_REJECTED event; if Y returns a RC_PORT_ACCEPT then the system will raise a CHANNEL-CONFIRMED event at the sending port event handler. |
| Step 5 | Y will also receive a CHANNEL_CONFIRMED event at its receiving port event handler indicating the system has established its receiving port. |
| Step 6 | A CHANNEL_CONFIRMED event is raised to the sending and receiving | port event handlers of all newly created channels. Note that this means that is is raised to the sending and receiving port event handlers of all channels that belongs to the same channel set as the explicitly created channel and whose containing application instance belongs to the same application set as the creator of the new channel, such as application Z at Node 3.

In collaborative group working it is often necessary to establish n-way communication between members of a group where participants are regularly joining or leave the group. It is difficult, or time consuming, for all participants to be constantly updating their lists of current members and to be modifying all the necessary data links. The creation of merged channels allows all the necessary data paths to be maintained by the underlying system with minimal involvement of the individual participants.

A Logical Channel has been defined to consist of a uni-directional data pipe with a sending port at one end and a receiving port at the other. Data always flows from the sending port to the receiving port. Notationally this is indicated by [Sending port: Receiving Port].

Figure 15:
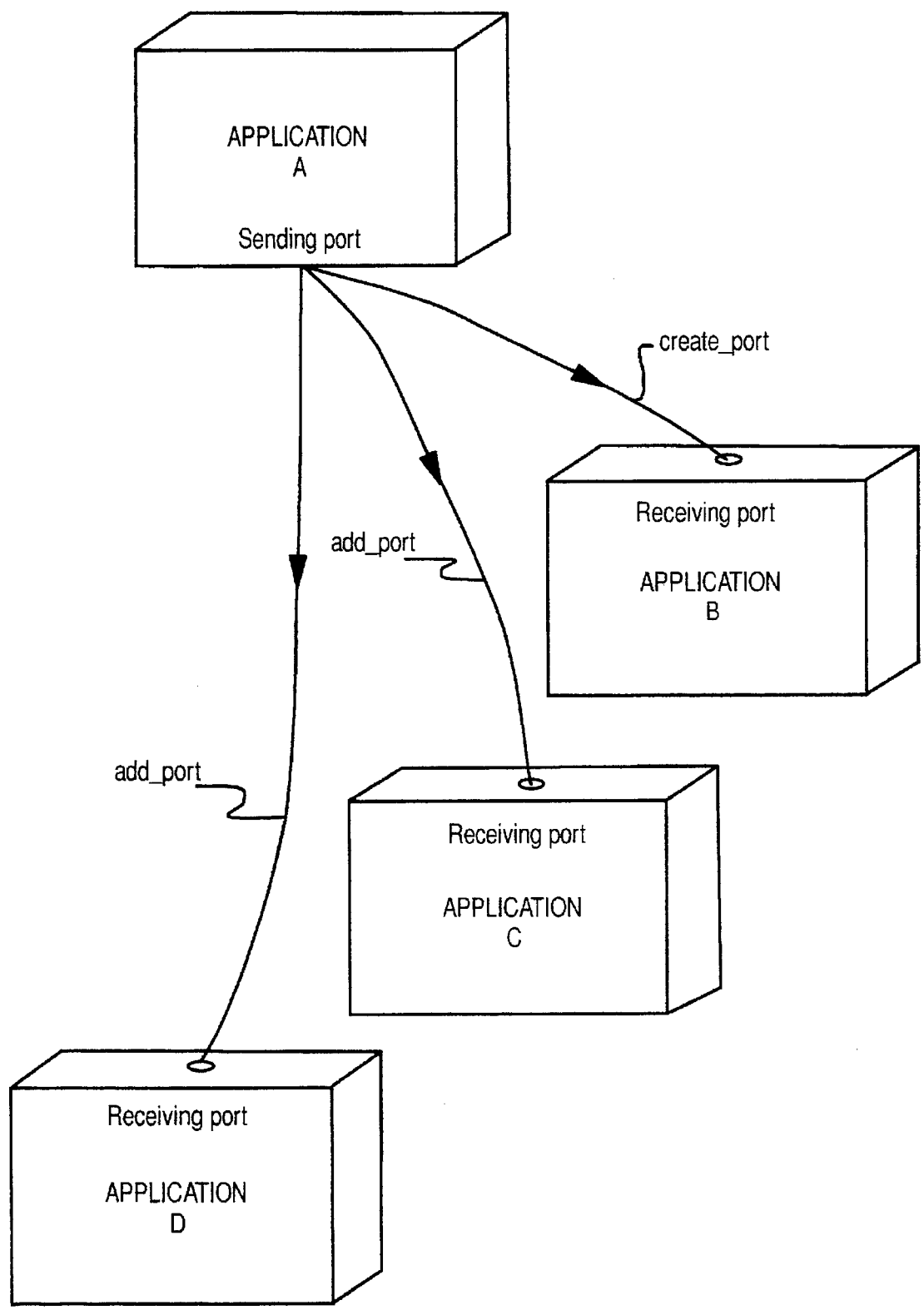
FIG. 15 illustrates the establishment of channels, whereby one sending node is associated with multiple receiving nodes.

Channels may be established so that one sending port may be associated with many receiving ports, that is, data sent through the single sending port will be delivered at all the receiving ports. This is illustrated in FIG. 15, and is Notationally indicated by [SP: RP1, RP2, . . . RPn].

Figure 16:
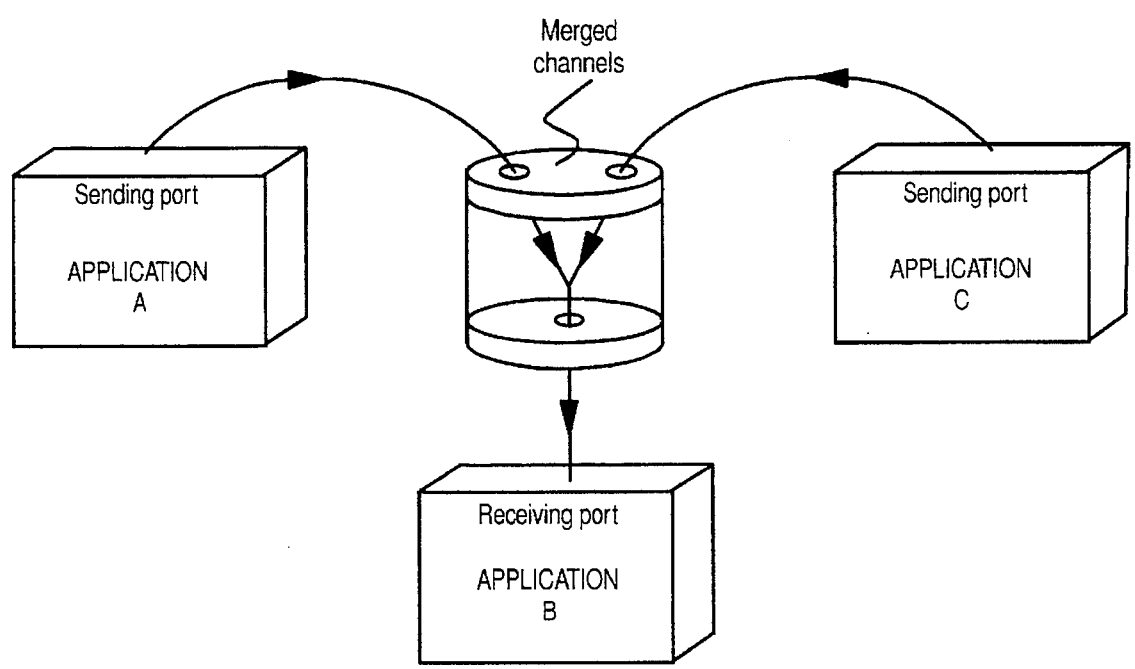
FIG. 16 illustrates an example of merged channels.

Logical channels may also be associated into name Channel Sets of different types; notationally indicated as CSname [SP:RP1,RP2 . . . RPn]type. The merged type of channel set is one in which the multiple sending ports all send data to a single receiving port. Conceptually all the "normal" receiving ports have been merged into this single receiving port. This is illustrated in the attached FIG. 16 and expressed notationally as CSname[SP1,SP2, . . . SPn:RP1]$_{merged}$ Two or more applications may define a merged channel set using the same channel set name consisting of different sending and receiving ports. For example application A may defined a merged channel set, CS1[SPa: RPb,RPc]$_{merged}$ and application B may defined a merged channel set CS1[SPd: RPe, RPf]$_{merged}$.

It should be noted that applications establish a collaborative session by referring to application names not by referring to the data channels established by these applications, i.e. by using the share_command.

In the above case application A shares with application B to form a collaborative working group. This results in the two definitions of the merged channel set, CS1 being combined so that the combined set of sending ports transmits data to the combined set of all receiving ports. Notationally the resultant channel set CS1 is defined as CS1[SPa,SPd: RPb,RPc,RPe,RPf]$_{merged}$ Note that in this case, as well as the channels explicitly created by application A (i.e. [SPa:RPb], [SPa:RPc]) and the channels explicitly created by application B (i,e, [SPd:RPe], [SPd:RPf]} new channels [SPa:RPe], [SPa:RPf], [SPd:RPb] and [SPd:RPc] are created by the system. Thus data channels now exist between all the cross connections of the sending ports and the receiving ports.

This leads to an extremely simple way of estsblishing bi-directional data channels between all members of a collaborative group without each member needing to know anything about the data channels established by the other members of the group.

Figure 17:
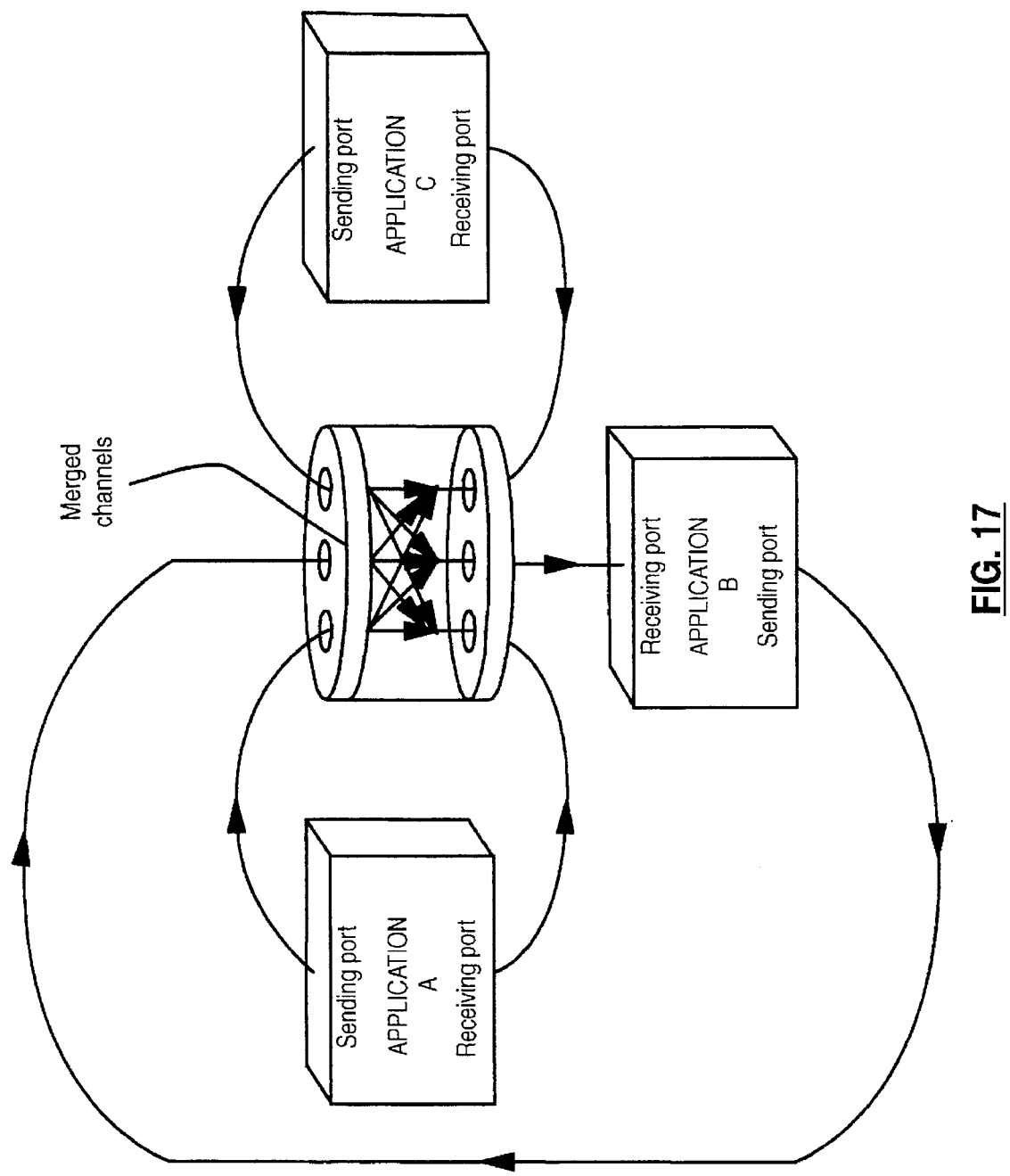
FIG. 17 illustrates another example of merged channels, having bi-directional channels between all members of a collaborative group.

The process is for each potential member application of a collaborative working group to establish a merged channel set consisting of a sending port associated with a receiving port both defined in the same application and using an agreed channel set name. That is, each potential application establishes a channel set such as CS1[SPa: RPa]$_{merged}$. When two or more applications (e.g. applications, A, B, C) form a collaborative group the different definitions of CS1 are combined to form the following merged set CS1[SPa,SPb,SPc:RPa,RPb,RPc]$_{merged}$ This is illustrated in FIG. 17.

New members may easily be added to the group with the necessary data channels being established automatically by the underlying system. The only requirement is that the new member knows the application name of an existing member and uses the same channel set name. The new member need not know anything about all the other members and indeed need not know about the data channels established by the application member providing the application name used to join the group. Similarly when an application leaves a group the invalid data channels are automatically deleted.

A special case arises where it is necessary to establish n-way communication between members of a group such that data sent by more than one member of the group arrives in the same sequence at all the members of the group. The creation of serialised channels allows sequencing of the data packets to be undertaken by the underlying system with minimal involvement of the individual participants.

Figure 18:
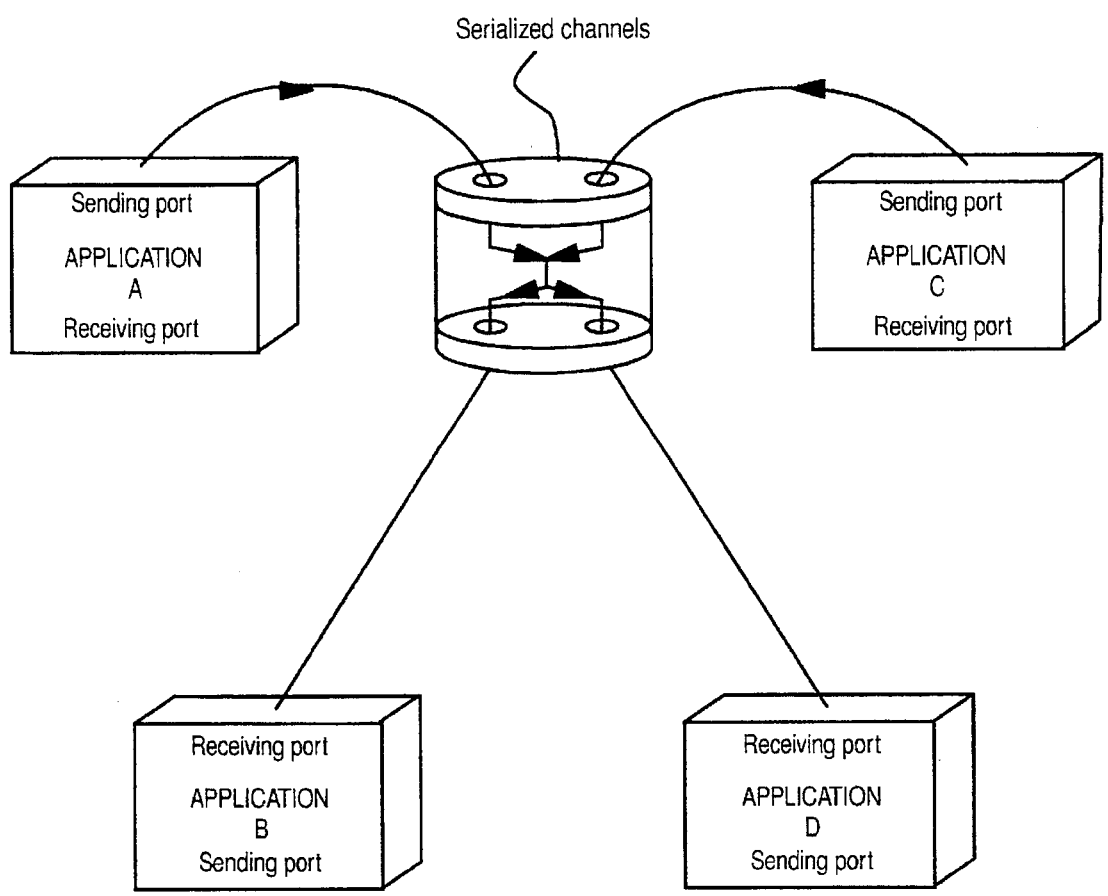
FIG. 18 illustrates a serialized channel set.

The serialised channel set, illustrated in FIG. 18, is one in which the multiple sending ports all send data to multiple receiving ports and require that the data arrives in the same order at all receiving ports. Conceptually the data is transmitted through a named channel set which has the property of serialising the data packets from all the sending ports (A,C) and forwarding the same sequence of packets to all the receiving ports (B,D). This is expressed notationally as CSname[SP1,SP2, . . . Srn:RP1,RP2, . . . RPn]$_{serialised}$ Similarly to merged channels, two or more applications may define a serialised channel set using the same channel set name consisting of different sending ports but with potentially common receiving ports. For example application A may defined a serialised channel set, CS1[SPa:RPb]$_{serialised}$ and application C may defined a serialised channel set CS1[SPc:RPd]$_{serialised}$.

As with merging, applications establish a collaborative session of by referring to application names not by referring to the data channels established by these applications. With reference to FIG. 18, application A joins with application C to form a collaborative working group. This results in the two definitions of the serialised channel set, CS1 being combined so that the combined set of sending ports transmits data in the same sequence to the combined set of all receiving ports. Notationally the resultant channel set CS1 is defined as CS1[SPa,SPc:RPb,RPd]$_{serialised}$ Note that in this case, as well as the channel explicitly created by application A (i.e. [SPa:RPb], and the channel explicitly created by application C (i.e. SPc:RPd], new channels [SPa:RPd] and [SPc:RPb] are created by the system. Thus data channels now existing between all the cross connections of the sending ports and the receiving ports. This is similar to the merged channel set concept. However there is the important additional constraint that the data packets are guaranteed to arrive at all the receiving ports in the identical sequence.

As with merging, this leads to an extremely simple way of establishing bi-directional serialised data channels between all members of a collaborative group without each member needing to now anything about the data channels established by the other members of the group.

Figure 19:
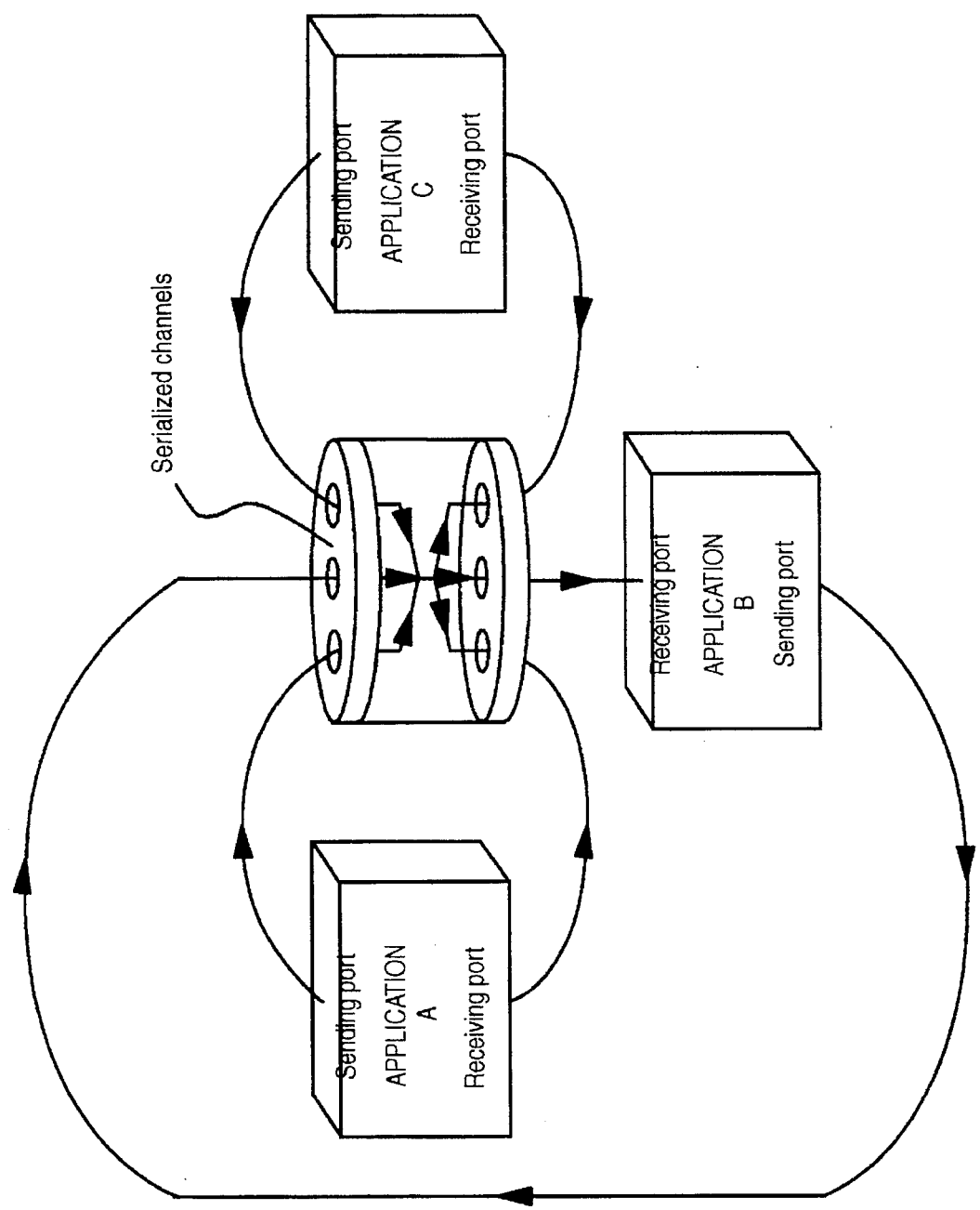
FIG. 19 illustrates another example of serialized channels having serialized bi-directional channels between all members of a collaborative group.

The process is for each potential member application of a collaborative working group to establish a serialised channel set consisting of a sending port associated with a receiving port both defined in the same application and using an agreed channel set name. That is, each potential application establishes a channel set such a $CS1[SPa:RPa]_{serialised}$. When two or more applications (e.g. applications, A,B,C) form a collaborative group, the different definitions of CS1 are combined to form the following serialised set $CS1[SPa,SPb,SPc:RPa,RPb,RPc]_{serialised}$ This is illustrated in FIG. 19.

New members may easily be added to the group with the necessary data channels being established and serialised automatically by the underlying system. The only requirement is that the new member knows the application name or an existing member and uses the same channel set name. The new member need not know anything about all the other members and indeed need now know about the data channels established by the application member providing the application name used to join the group. Similarly when application leave a group the valid data channels are automatically re-established.

Figure 20:
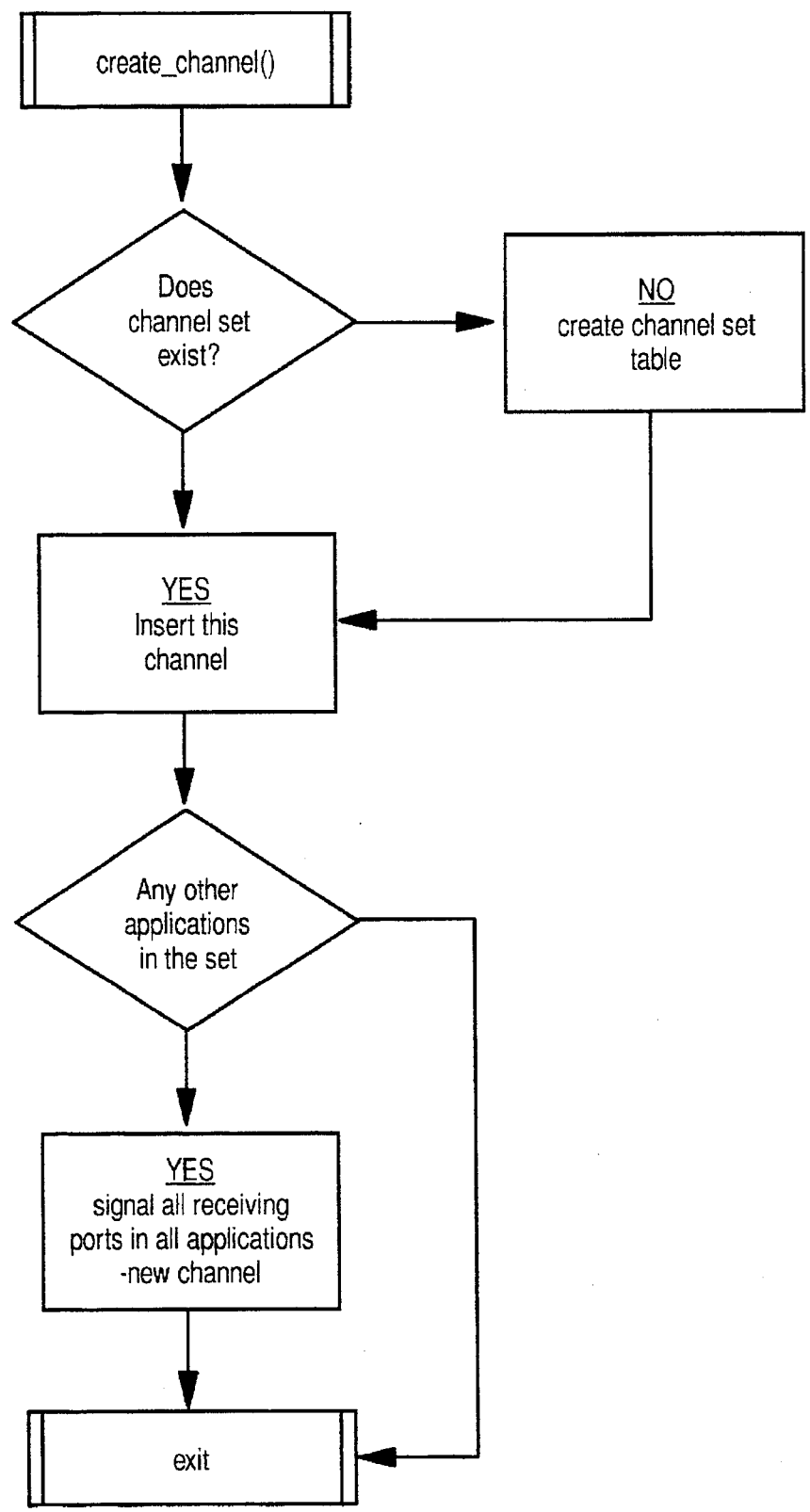
FIG. 20 is a flow diagram illustrating the creation of merged and serialized channels.

The creation of merged and serialised channels by the support system is also illustrated by the flow diagram of FIG. 20.

Figure 21:
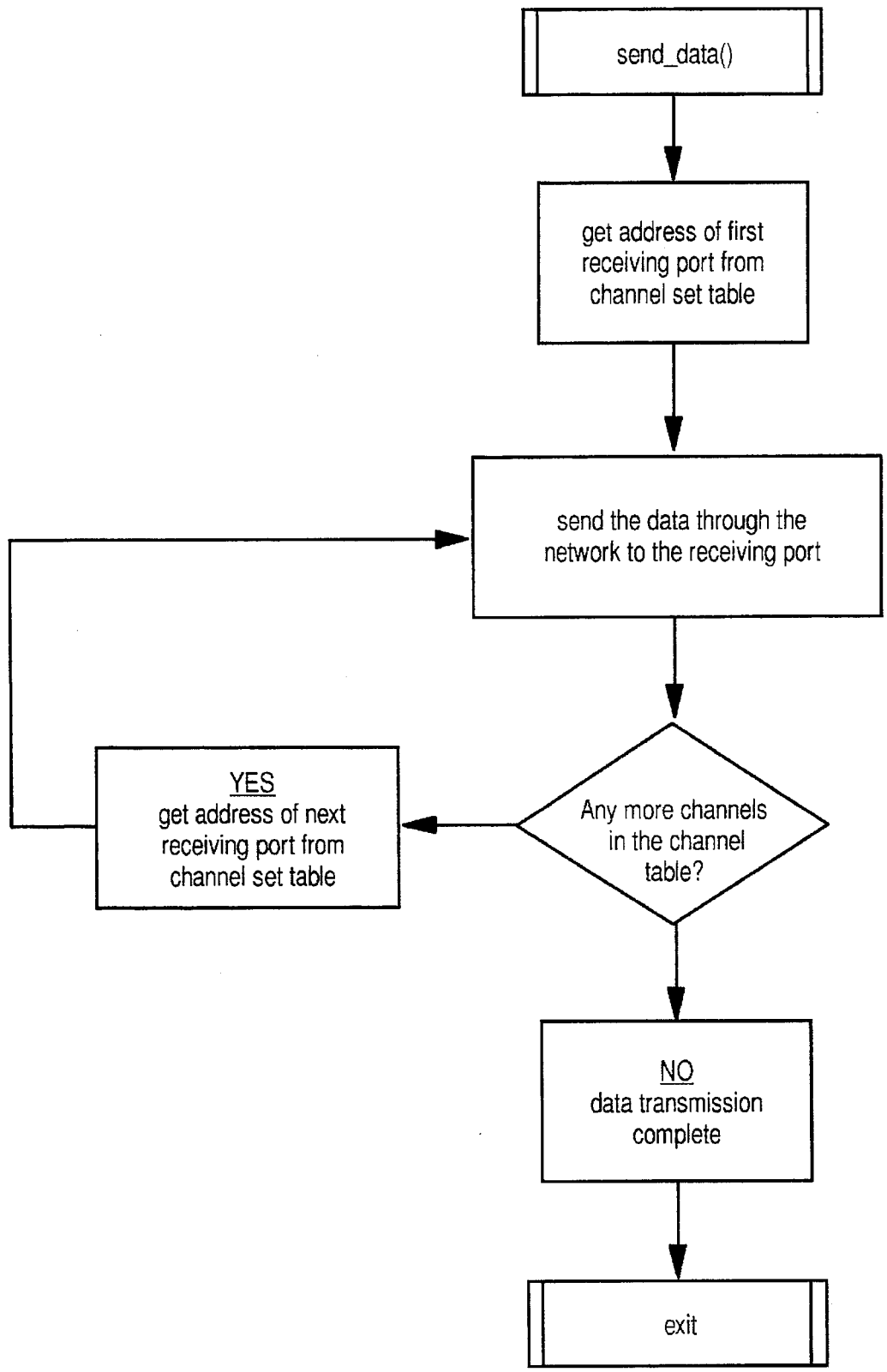
FIG. 21 is a flow diagram illustrating the implementation of merged channels.

In order to implement a merged channel which is, of course, only a model for programming purposes, the subsystem 17 maintains a channel set table for each merged channel which contains at least the addresses of the receiving ports. As shown in the flow diagram of FIG. 21, in response to a send_data command to send data to a specified buffered receiving port which is part of a merged channel set, the subsystem sends the data in turn to each receiving port in the channel set until it has exhausted the table.

Figure 22:
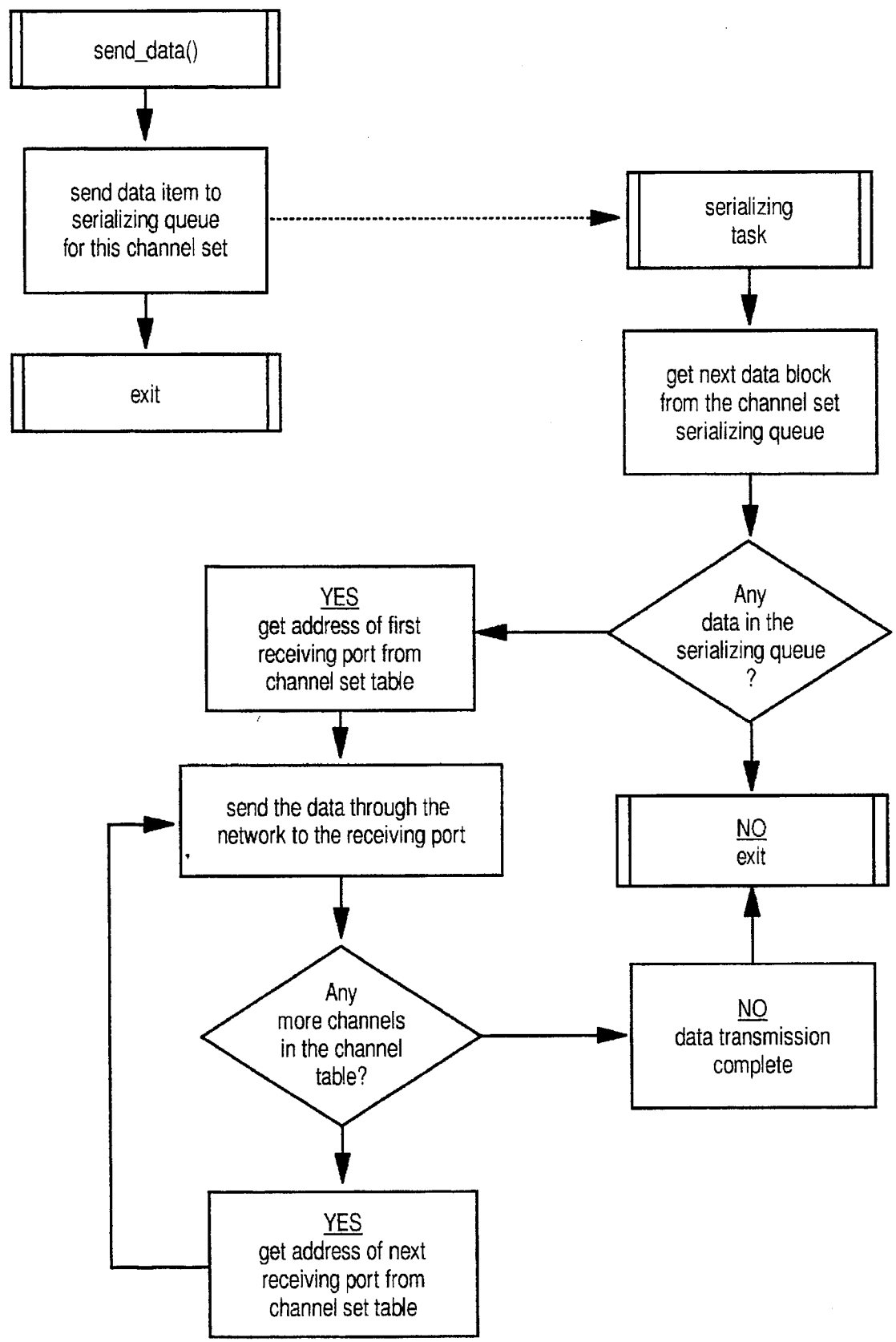
FIG. 22 is a flow diagram illustrating the implementation of serialized channels.

In order to implement a serialised channel, as illustrated in the flow diagrams of FIG. 22, the subsystem uses a similar technique of establishing a channel set table with the addresses of all receiving ports. However, it also needs to maintain a serialising queue for the channel in which the data items to be serialised are loaded from the sending ports and held in the order in which it is desired to transmit them to all receiving ports.

Synchronising of the channels of a channel set is also provided when the channel type is "synchronised". For example, it is often necessary to establish n-way communication between members of a group such that multiple types of data (e.g. audio, video, keystrokes or mouse pointings) sent by one (or possible more than one) member of the group is delivered in a synchronised fashion at all the receiving members of the group. The synchronisation of the data packets is undertaken by the underlying system with minimal involvement of the individual participants.

This type of channel set is one in which a source application is sending different types of data such as audio and video through separate data channels to a target application. Typically there is a single source application and a single target application. However, a single source application may send to multiple target applications, or multiple source applications may send to multiple target applications provided that in this case the synchronised receiving channels are in the same application. The typical case is illustrated below.

Figure 23:
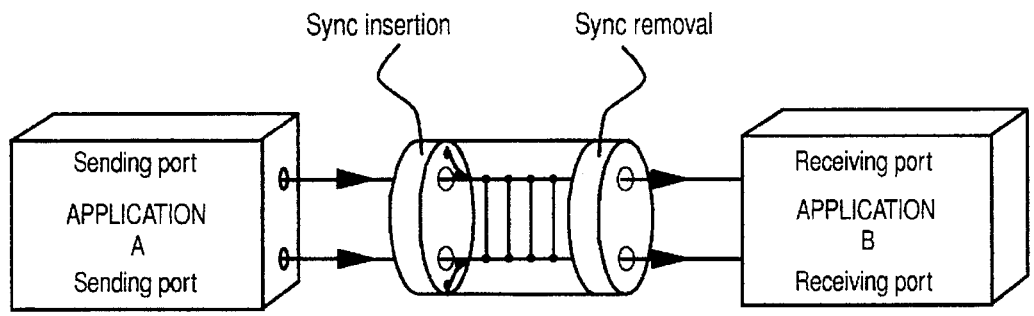
FIG. 23 is a schematic diagram illustrating the synchronized channels.

Conceptually the data is transmitted through a named channel set which has the property of synchronising the data packets from the sending port of inserting synchronising pulses in to the data stream as the data is transmitted. Whenever a synchronising pulse arrives at the receiving end of one of the associated channels the data on that channel is held up until a matching synchronising pulse arrives on all the other channels. When all synchronising pulses have arrived the data is allowed to flow through all the channels until the next synchronising pulse arrives on one of the channels. The synchronising pulses are removed by the underlying system before the data is presented. This is illustrated in FIG. 23 and expression notationally as $CSname\{[SP1:RP1], [SP2:RP2], \ldots\}_{synchronised}$ If an application, A, first establishes the following synchronised channel set with a second application, B $CSname\{[SPa1:RPb1],[SPa2:RPb2]\}_{synchronised}$ It may then form a collaborative session with another application, C, and add further synchronising channels with the same sending ports, i.e.

$CSname\{[SPa1:RPc1],[SPa2:RPc2]\}_{synchronised}$

In this case synchronisation will occur between the data arriving at application B's receiving ports and application C's receiving ports. Notationally the resultant channel set is $CSname\{[SPa1:RPb1,RPc1],$
$[SPa2:RPb2,RPc2]\}_{synchronised}$ Similarly if application A establishes a channel set for one data type $CSname\{[SPa1:RPb1,RPc1]\}_{synchronised}$ and application D establishes the same channels set for a second data type $CSname\{[SPd2:RPb2,RPc2]\}_{synchronised}$ If applications A and D now form a collaborative group the transmission of data type 1 and data type 2 will be synchronised at applications B and C. That is the synchronising channel set is now $CSname\{[SPa1:RPb1,RPc1],$
$[SPd2:RPb2,RPc2]\}_{synchronised}$ If there is a significant delay before all the synchronising pulses are matched then the underlying system will send the appropriate control signals to the sending ports requesting the relevant ports to speed up or slow down.

In collaborative group working, and application often acts as an intermediary, setting up a link between the two remote applications.

By connecting and welding of ports to support data streaming, an application can transfer most (or even all) of the work involved in acting as a link in the transmission of data between two remote workstations onto the underlying system 17. Once the links have been established, the application can reduce its involvement in transmitting data by providing a means by which the data streaming can be carried out entirely by the underlying system.

A Logical Channel is defined to consist of a unidirectional data pipe with a sending port at one end and a receiving port at the other. The structure of a sending port was shown in FIG. 8. As far as the application is concerned, the port acts as the interface to the channel.

The application also has to provide an event handler which will be notified of various events. System defined events include acknowledgement of data receipt and transmission errors. A function is provided to allow the application at either end to send an application-defined string to the other end. This signal function raises a signal event at the other end.

Optionally the application can now provide a user exit which is invoked as the data is about to be sent. This user exit acts as a filter—it can insert, delete and modify the data as it wishes. Among the tasks that might be assigned to a user exit are compression and encryption (with the corresponding decompression or decryption taking place in the user exit at the receiving port.

Several ports of the type may surface within the same application. An application which has one port of each type may act a simple intermediary by merely sending every data packet received at the receiving port onward through the sending port. A program to perform this function, while conceptually very simple, nevertheless involves considerable overhead, since each data packet has to be read, the data moved from the receiving buffer to a transmitting buffer and then written. Two functions, connect and weld are provided by the underlying system to allow this overhead to be reduced.

Figure 24:
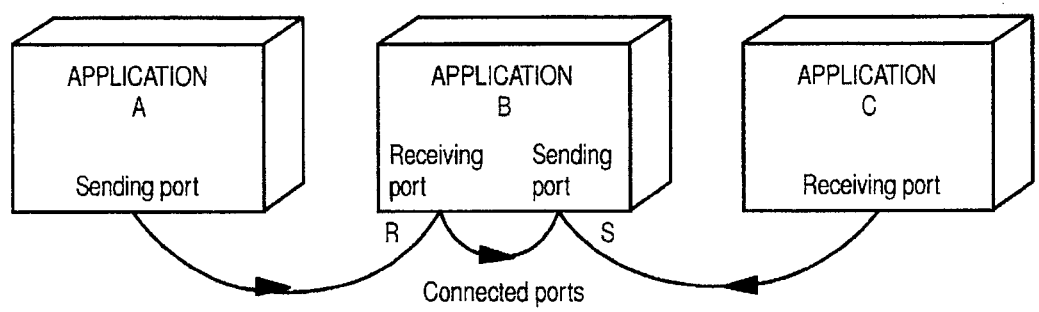
FIG. 24 is a schematic diagram showing two connected ports.

The first function, Connect effectively glues a receiving port to a sending port so that, although the two ports may still be referenced by the application, data flows automatically across the connection, as shown in FIG. 24. This streaming of data reduces the overhead involved, since the application no longer has to receive, move and then send each data packet. As is clear from the diagram, only one queue now needs to be maintained by the underlying system.

After a connection, the two ports still exist within the application, so the various port-related functions can still be used. For example, the ports can be disconnected again, they can be removed and signals may still be sent. Since there is no longer any access to the data path however, it is no longer possible to send (via the sending port) or receiving (via the receiving port).

Note that the event handlers are no longer needed, since any remote signals are passed on automatically. However, both user exits are retained. This is because these exits may be performing tasks such as data conversion that are necessary to maintain the integrity of the data, Since the user exits are part of the application program, the connection will be lost (along with both ports) when the application terminates.

Figure 25:
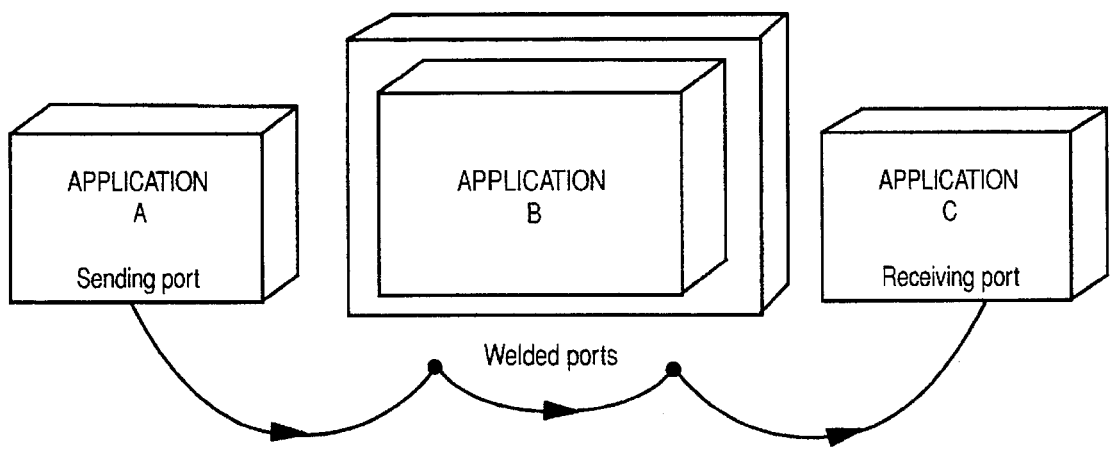
FIG. 25 is a schematic diagram showing two welded ports.

In the case where neither port requires a user exit, a connection can be welded. A weld involves removing the ports, thus severing all links between the application and the channels. Since the ports no longer exist, a weld is irreversible. The end results is as though the channel were directly connected between the two remote ends. Since the application is no longer involved, after a weld it may terminate if it wishes. FIG. 25 shows the result of a weld.

Note that this may make it possible for considerable optimisation to be carried out by the underlying system after a weld. For example the data traffic may be rerouted, so that it no longer travels through this node at all.

We claim:

1. A programmable workstation for collaborative working in a network of workstations forming the nodes of the network, the network being connected by physical links for the transmission of data between nodes;

the workstation comprising an operating system;

a network control program layer, running on the operating system, for controlling physical routing of data between nodes; and a collaborative application support program layer for interfacing with application programs running on the workstation and responsive to predetermined application program calls to create a logical network model of a collaborative environment comprising sharing sets of application programs, which share data and resources within and across nodes, and logical dedicated data channels connecting members of a sharing set of application programs, each data channel being defined by a sending port and a receiving porteach associated with an application program, the collaborative application support program layer being adapted to cooperate with the network control program layer to establish the physical links necessary to implement the logical network model in a physical network, transparently to the application programs wherein logical data channels have both a channel type and a channel set name, channels of the same type and set name in the same sharing set of applications forming a channel set in which data received over any channel of the set is dependent on data on other channels of the set in accordance with predetermined properties associated with the channel type.

2. A workstation as claimed in claim 1 in which a merged channel type comprising a plurality of channels is defined whose predetermined properties are that data is merged from a plurality of sending ports of the channels of the merged channel set and delivered to at least one receiving port at a target application as a single data stream.

3. A workstation as claimed in claim 2 in which in a merged channel set including multiple sending and receiving ports, data channels are created by the support system between all the cross connections of the sending ports and the receiving ports.

4. A workstation as claimed in claim 1 in which a serialised channel type is defined whose predetermined properties are that data from the sending ports of a serialised channel set is combined and delivered to each of multiple receiving ports in the channel set in the same serial order.

5. A workstation as claimed in claim 3 or claim 4 in which, in the case where multiple sharing sets of application programs, each including merged or serialised channel sets of the same name, are themselves combined to form a larger sharing set, data channels not explicitly created by the sharing applications are created by the support system between all the cross connections of all the sending and receiving ports.

6. A workstation as claimed in claim 5 in which an application program may establish bi-directional communication with all members of an existing sharing set whose members are connected by a merged or serialised channel set by joining the set and creating a single merged channel of the same channel set name between its own sending and receiving ports.

7. A workstation as claimed in claim 1 in which a synchronised channel type is defined whose predetermined properties are that data on the different channels of a synchronised channel set is time synchronised at each receiving port of the channel set.

8. A workstation as claimed in claim 7 in which synchronisation is achieved by insertion of synchronising signals at each sending port and removal of the synchronising signals at each receiving port of the synchronised channel set.

9. A programmable workstation for collaborative working in a network of workstations forming the nodes of the network, the network being connected by physical links for the transmission of data between nodes;

the workstation comprising an operating system;

a network control program layer, running on the operating system, for controlling physical routing of data between nodes; and a collaborative application support program layer for interfacing with application programs running on the workstation and responsive to predetermined application program calls to create a logical network model of a collaborative environment comprising sharing sets of application programs, which share data and resources within and across nodes, and logical dedicated data channels connecting members of a sharing set of application programs, each data channel being defined by a sending port and a receiving port each associated with an application program, the collaborative application support program layer being adapted to cooperate with the network control program layer to establish the physical links necessary to implement the logical network model in a physical network, transparently to the application programs wherein, in response to a predetermined program call by a first application program through which data is being transferred, via receiving and sending ports of the first application, between two other applications, the receiving port of the first application is permanently directly connected to its sending port so that a direct data channel, in which the first application plays no further part, is created between the two other applications.

10. A method of collaborative working in a network of programmable workstations forming the nodes of a network connected by physical links for the transmission Of data between nodes, the method comprising the steps of:

in response to predetermined calls from application programs running on the workstation, creating a logical network model of a collaborative working environment for use by the application programs comprising of sharing sets of application programs, which share data and resources within and across nodes, and logical dedicated data channels connecting members of a sharing set of application programs, each data channel being defined by a sending port and a receiving port each associated with an application program, and establishing the physical links necessary to implement the logical network model in a physical network, transparently to the application programs in which logical data channels have both a channel type and a channel set name, channels of the same type and set name in the same sharing set of applications forming a channel set in which data received over any channel of the set is dependent on data on other channels of the set in accordance with predetermined properties associated with the channel type.

11. A method as claimed in claim 10 in which a synchronised channel type is defined whose predetermined properties are that data on the different channels of a synchronised channel set is time synchronised at each receiving port of the channel set.

12. A method as claimed in claim 8 in which synchronisation is achieved by insertion of synchronising signals at each sending port and removal of the synchronising signals at each receiving port of the synchronised channel set.

13. A method as claimed in claim 10 in which, in response to a predetermined program call by a first application program through which data is being transferred, via receiving and sending ports of the first application, between two other applications, the receiving port of the first application is permanently directly connected to its sending port so that a direct data channel, in which the first application plays no further part, is created between the two other applications.

14. A method as claimed in claim 10 in which, in response to a first application program, which is receiving data from a second application program from a receiving port transferring said data to a sending port to be forwarded to a third application, making a predetermined call to said collaborative application support program layer, said collaborative application support program layer reversibly connecting said receiving port directly to said sending port so that data may be transferred from said second application to said third application without passing through said first application.

15. A method as claimed in claim 10 in which a serialised channel type is defined whose predetermined properties are that data from the sending ports of a serialised channel set is combined and delivered to each of multiple receiving ports in the channel set in the same serial order.

16. A method of collaborative working in a network of programmable workstations forming the nodes of a network connected by physical links for the transmission of data between nodes, the method comprising the steps of:

in response to predetermined calls from application programs running on the workstation, creating a logical network model of a collaborative working environment for use by the application programs comprising of sharing sets of application programs, which share data and resources within and across nodes, and logical dedicated data channels connecting members of a sharing set of application programs, each data channel being defined by a sending port and a receiving port each associated with an application program, and establishing the physical links necessary to implement the logical network model in a physical network, transparently to the application programs in which a merged channel type comprising a plurality of channels is defined whose predetermined properties are that data is merged from a plurality of sending ports of the channels of the merged channel set and delivered to at least one receiving port at a target application as a single data stream.

17. A method as claimed in claim 16 in which in a merged channel set including multiple sending and receiving ports, data channels are created by the support system between all the cross connections of the sending ports and the receiving ports.

18. A method as claimed in claim 17 or claim 15 in which, in the case where multiple sharing sets of application programs, each including merged or serialised channel sets of the same name, are themselves combined to form a larger sharing set, data channels not explicitly created by the sharing applications are created by the support system between all the cross connections of all the sending and receiving ports.

19. A method as claimed in claim 18 in which an application program may establish bi-directional communication with all members of an existing sharing set whose members are connected by a merged or serialised channel set by joining the set and creating a single merged channel of the same channel set name between its own sending and receiving ports.

20. A programmable workstation for collaborative working in a network of workstations forming the nodes Of the network, the network being connected by physical links for the transmission of data between nodes;

the workstation comprising an operating system;

a network control program layer, running on the operating system, for controlling physical routing of data between nodes; and a collaborative application support program layer for interfacing with application programs running on the workstation and responsive to predetermined application program calls to create a logical network model of a collaborative environment comprising sharing sets of application programs, which share data and resources within and across nodes, and logical dedicated data channels connecting members of a sharing set of application programs, each data channel being defined by a sending port and a receiving port each associated with an application program, the collaborative application support program layer being adapted to cooperate with the network control program layer to establish the physical links necessary to implement the logical network model in a physical network, transparently to the application programs wherein, wherein, in response to a first application program, which is receiving data from a second application program from a receiving port and transferring said data to a sending port to be forwarded to a third application, making a predetermined call to said collaborative application support program layer, said collaborative application support program layer reversibly connects said receiving port directly to said sending port so that data may be transferred from said second application to said third application without passing through said first application.

* * * * *